(12) United States Patent
McHale et al.

(10) Patent No.: US 9,237,691 B2
(45) Date of Patent: Jan. 19, 2016

(54) COMBINED BALER/BALE WRAPPER

(75) Inventors: Padraic Christopher McHale, Clonbur (IE); Martin William McHale, Kilmaine (IE); James John Heaney, Hollymount (IE); Gerard Patrick Sheridan, Kilmaine (IE); Patrick Thomas O'Connor, Kilmaine (IE); John Patrick Biggins, Hollymount (IE)

(73) Assignee: WELMOUNT LIMITED, Kilmaine (IE)

( * ) Notice: Subject to any disclaimer, the term of this patent is extended or adjusted under 35 U.S.C. 154(b) by 0 days.

(21) Appl. No.: 13/311,622

(22) Filed: Dec. 6, 2011

(65) Prior Publication Data

US 2012/0137630 A1 Jun. 7, 2012

Related U.S. Application Data

(62) Division of application No. 10/472,399, filed as application No. PCT/IE02/00037 on Mar. 22, 2002, now Pat. No. 8,091,326.

(30) Foreign Application Priority Data

Mar. 22, 2001 (IE) .................................. S2001/0286
Jul. 19, 2001 (IE) .................................. S2001/0678

(51) Int. Cl.
*A01F 15/07* (2006.01)
*A01F 15/08* (2006.01)
(Continued)

(52) U.S. Cl.
CPC ........... *A01F 15/0883* (2013.01); *A01F 15/071* (2013.01); *A01D 39/005* (2013.01);
(Continued)

(58) Field of Classification Search
USPC ........... 53/211, 465, 215, 216, 587, 399, 588, 53/409, 580, 397, 582, 203, 204
IPC ......... A01F 15/071,15/0715, 2015/0735; B65B 13/00, 11/04; A01D 59/00, 39/00, 39/005
See application file for complete search history.

(56) References Cited

U.S. PATENT DOCUMENTS

| | | | |
|---|---|---|---|
| 4,499,714 | A | 2/1985 | Hollmann |
| 4,641,484 | A | 2/1987 | Popelka |

(Continued)

FOREIGN PATENT DOCUMENTS

| | | |
|---|---|---|
| DE | 2837780 A | 8/1978 |
| DE | 29911916 | 9/1999 |

(Continued)

OTHER PUBLICATIONS

International Search Report for PCT/IE/02/00037 dated Jul. 29, 2002.

*Primary Examiner* — Christopher Harmon
(74) *Attorney, Agent, or Firm* — Sughrue Mion, PLLC

(57) ABSTRACT

A combined baler/bale wrapper (1) comprises a chassis (5) on which a baler (10) and a bale wrapper (11) are mounted. The baler (10) comprises a stationary segment (18), a lower segment (19) and an upper segment (20) which together define a bale forming chamber (15) within which a round bale (2) is formed. The lower segment (19) and the upper segment (20) are pivotal from a bale forming position (FIG. 5) to a discharge position (FIG. 1) for transferring a bale of the bale forming chamber (15) onto bale supporting rollers (50) of the bale wrapper (11). The bale supporting rollers (50) rotate the bale (2) about a first wrapping axis (53) while a carrier ring (55) simultaneously revolves a pair of wrapping material dispensers (54) about a second wrapping axis (56) for dispensing wrapping material onto the bale (2).

21 Claims, 18 Drawing Sheets

(51) Int. Cl.
 A01D 59/00 (2006.01)
 B65B 11/04 (2006.01)
 B65B 13/00 (2006.01)
 A01D 39/00 (2006.01)

(52) U.S. Cl.
 CPC ............ *A01D 59/00* (2013.01); *A01F 15/0715* (2013.01); *A01F 2015/074* (2013.01); *A01F 2015/0735* (2013.01); *A01F 2015/0775* (2013.01); *B65B 11/04* (2013.01); *B65B 13/00* (2013.01)

(56) References Cited

U.S. PATENT DOCUMENTS

| | | | |
|---|---|---|---|
| 4,685,270 A | | 8/1987 | Brambilla |
| 4,736,567 A | | 4/1988 | Pienta |
| 4,815,266 A | * | 3/1989 | Ratzlaff et al. .................. 56/341 |
| 5,048,271 A | | 9/1991 | Walton |
| 5,740,662 A | | 4/1998 | Royneberg et al. |
| 5,802,805 A | | 9/1998 | Oiestad |
| 5,822,967 A | * | 10/1998 | Hood et al. ...................... 56/341 |
| 5,875,709 A | * | 3/1999 | Tertilt ............... 100/89 |
| 6,082,076 A | | 7/2000 | Anderson et al. |
| 6,341,470 B1 | * | 1/2002 | Lacey ............... 53/176 |
| 6,421,996 B1 | * | 7/2002 | Deutsch et al. ................. 56/341 |
| 6,457,295 B1 | | 10/2002 | Arnold |
| 6,467,237 B2 | | 10/2002 | Viaud |
| 6,499,276 B2 | * | 12/2002 | Lacey ............... 53/438 |
| 6,708,469 B2 | * | 3/2004 | Lacey ............... 53/582 |
| 6,722,110 B1 | | 4/2004 | Royneberg |
| 6,840,023 B2 | | 1/2005 | Roth et al. |
| 6,901,719 B2 | * | 6/2005 | Viaud ............... 53/118 |
| 6,928,796 B2 | * | 8/2005 | Viaud ............... 53/587 |

FOREIGN PATENT DOCUMENTS

| | | |
|---|---|---|
| EP | 0309938 A1 | 9/1988 |
| EP | 0937384 A1 | 8/1999 |
| EP | 0983720 A1 | 3/2000 |
| EP | 1048201 A1 | 11/2000 |
| GB | 2152873 A | 1/1985 |
| WO | WO 9904613 | 2/1999 |
| WO | WO 0059290 A1 | 10/2000 |

\* cited by examiner

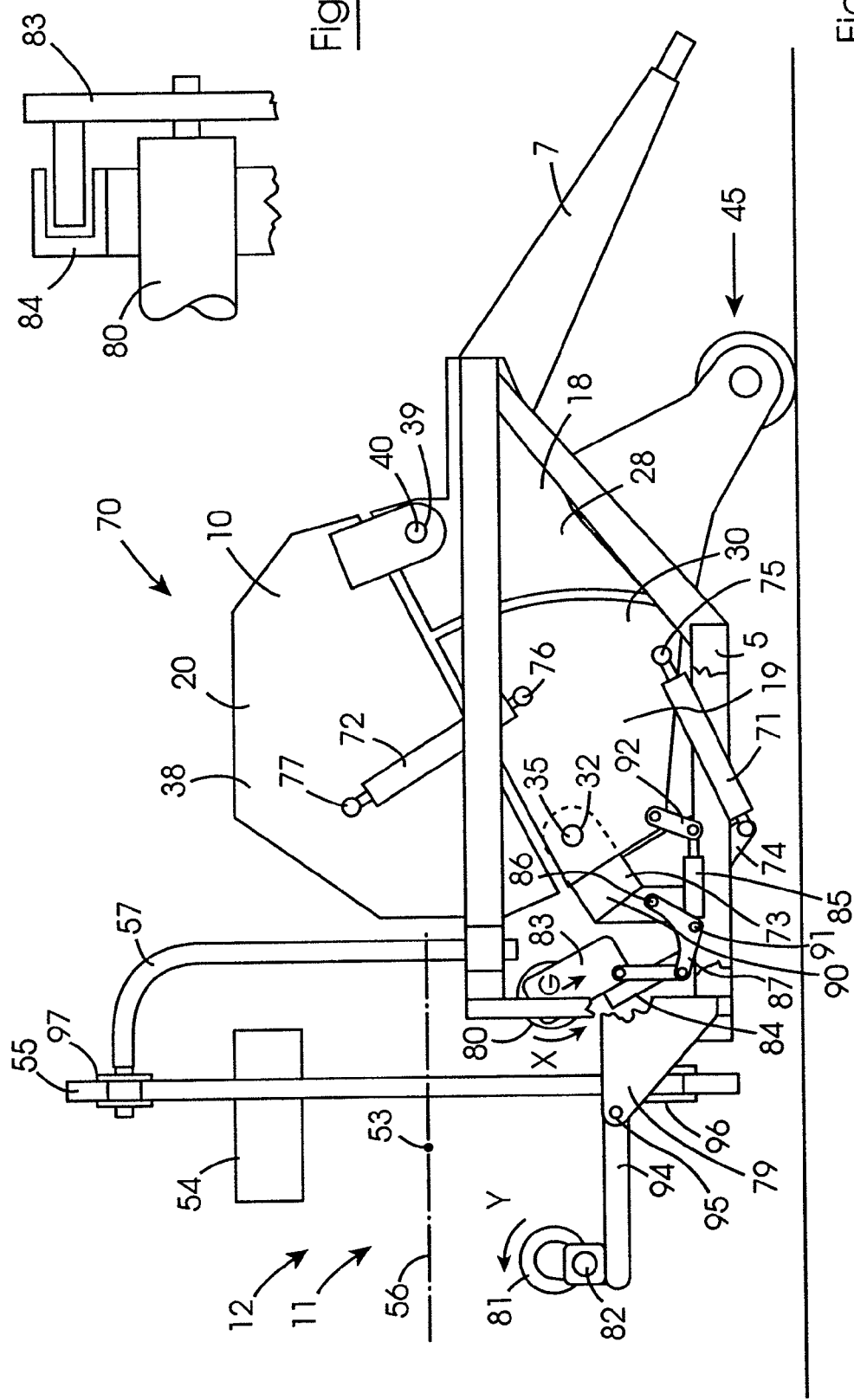

COMBINED BALER/BALE WRAPPER

This application is a divisional of U.S. patent application Ser. No. 10/472,399 filed Sep. 20, 2006, which is a national stage of PCT Application No. PCT/IE02/00037 filed Mar. 22, 2002, which claims benefit to Irish Patent Application No. S20010286 filed Mar. 22, 2001, and Irish Patent Application No. S20010678 filed Jul. 19, 2001. The above-noted applications are incorporated herein by reference in their entirety.

BACKGROUND OF THE INVENTION

The present invention relates to a combined baler/bale wrapper for forming and wrapping a cylindrical bale of material in a wrapping material.

Baling of hay, straw, silage and other fibrous animal fodder crops is well known. Such crops may be formed into parallelepiped shaped bales or cylindrical bales. Parallelepiped bales may be relatively small bales which are typically referred to as rectangular bales, or relatively large bales which commonly are referred to as large square bales. Cylindrical bales are commonly referred to as round bales and typically are of diameter of 1.25 meters approximately and of axial length of approximately 1.25 meters. When grass has been baled to form silage, the bale must be wrapped, in order to seal the baled silage from air to allow the normal silage chemical fermentation process take place. Typically the wrapping material is a plastics film material having an adhesive coating on one side, and typically, is opaque to prevent light reaching the silage, and more commonly is of colour black, white or green.

In general, in the production of round bales, a baler is provided for forming the round bale, and the formed round bale is then deposited on the ground, typically, in the field from which the grass has been harvested. A bale wrapper then picks up the formed bale and wraps the bale in the film material. This, thus, requires two pieces of apparatus, the first being the baler, and the second being the bale wrapper. By virtue of the fact that two pieces of apparatus are required, two vehicles for towing and powering the respective apparatus are also required, and thus, in general, two tractors are required, one for towing and powering the baler, and the other for towing and powering the bale wrapper.

Attempts have been made to provide integral baler/bale wrappers and combination baler/bale wrappers. In the case *of integral baler/bale wrappers the baler is provided with a bale forming chamber within which the bale is formed. The bale forming chamber typically is formed by a lower segment and an upwardly moveable upper segment. When the bale has been formed in the bale forming chamber the upper segment is raised for exposing approximately half the bale, and a bale wrapping mechanism co-operates with the lower segment of the bale forming chamber for facilitating wrapping of the bale. Such baler/bale wrappers are disclosed in PCT Specification Nos. WO 97/18699, WO 00/36903 both of Kverneland, WO 96/08957 of Oiestad, WO 00/15023 of Bertrand, and German Patent Specification No. 38 05 224 of Schenke.

In the case of combination baler/bale wrappers, a baler and a bale wrapper are typically provided on a common platform, or on respective interconnected platforms, and the formed bale is transferred from the baler to the bale wrapper for wrapping. Such baler/bale wrappers are disclosed in European Patent Specification No. 0,983,720 of Grundero, and PCT Specification No. WO 99/04613 of Comtor.

In general, both integral baler/bale wrappers and combination baler/bale wrappers known heretofore suffer from a number of disadvantages. In general, integral baler/bale wrappers are slow and inefficient. The bale is formed and wrapped in the same chamber. Thus, the formation of the bale and its wrapping must be carried out simultaneously in the bale forming chamber. Accordingly, while a bale is being wrapped another bale cannot be formed until the wrapped bale has been discharged from the bale forming chamber, and the bale forming chamber has been re-formed. Additionally, due to the fact that the bale forming chamber must be split in order to allow wrapping of the bale to take place therein, an upper segment of the bale forming chamber is raised a relatively significant height from a lower segment in which the bale is rotated during wrapping, and thus, the overall height of such balers tends to be unacceptably high, and as such, such integral baler/bale wrappers tend to be relatively cumbersome.

In the case of combination baler/bale wrappers an additional transfer mechanism is generally required for transferring a formed bale from the baler to the bale wrapper. Such transfer mechanisms tend to be cumbersome and inefficient. In general, because of the arrangement of the baler and the bale transfer mechanism, and also because of the arrangement of the transfer mechanism and the bale wrapper, during transfer of the bale no other operation can take place. In other words, the baler cannot commence forming the next bale, and furthermore, the bale wrapping means must be disabled. Because of this, considerable time is lost during transfer of the bale from the baler to the bale wrapper. In general, the bale is discharged downwardly from the baler, and during downward discharge of the bale from the baler a rear tailgate of the baler is pivoted rearwardly upwardly for facilitating discharge of the bale from the baler. By virtue of the fact that the bale is discharged at a low level from the baler, the bale transfer mechanism must then raise the bale from the low level upwardly onto the bale wrapper. This requires that the tailgate remain in the open position until the bale has been transferred. Only after transfer of the bale can the tailgate be urged downwardly into the closed position. Thus, the baler must remain inoperative from the point of view of forming a bale for the entire period that the bale is being discharged from the baler, and also for the entire period during which the bale transfer mechanism is transferring the bale upwardly onto the bale wrapper. Furthermore, in general, the tailgate of the baler must remain in the open position until the transfer mechanism has returned to a lower position ready to receive the next bale. Otherwise, in many cases it is not possible to return the transfer mechanism to the lower position with the tailgate of the baler in the closed position. This, thus, significantly slows down the operation of such combined baler/bale wrappers.

A further disadvantage of combination baler/bale wrappers is that by virtue of the fact that a separate transfer mechanism is required for transferring the bale from the baler to the bale wrapper space is required between the baler and the bale wrapper for accommodating such transfer mechanism, and this, thus, tends to increase the overall length of combination baler/bale wrappers.

A further disadvantage of combination baler/bale wrappers is that in general, it is difficult to match the wrapping speed of the bale wrapper to the forming speed of the baler, and in general, the speed at which the bales are formed is significantly higher than the speed at which the bales are wrapped. This, thus leads to inefficiencies in that either the baler must be operated at a speed lower than its capability, or alternatively, must be allowed to idle between the forming of each bale to allow time for wrapping of the formed bale.

A still further disadvantage of combined baler/bale wrappers known heretofore is that the transfer means for transferring a formed bale from the baler to the bale wrapper is in many cases incapable of transferring the formed bale to the bale wrapper during downhill operation of the baler/bale wrapper. Thus, in practice, such baler/bale wrappers known heretofore in many cases are unsuitable for use in hilly areas.

Another type of baler/bale wrapper is disclosed in U.S. Pat. No. 5,822,967 of Vermeer. The baler/bale wrapper disclosed in this U.S. specification comprises a baler in which a bale is formed, and a separate bale wrapping area in which the formed bale is wrapped. However, the bale is transferred from the baler to the bale wrapping area by a portion of the baler which pivots rearwardly downwardly and carries the bale from the baler in a generally downwardly direction into the bale wrapping area. However, the portion of the baler which transfers the bale into the bale wrapping area is required for rotating the bale in the bale wrapping area during wrapping of the bale. Accordingly, this baler/bale wrapper tends to be relatively inefficient, in that a bale cannot be formed by the baler/bale wrapper while another bale is being wrapped. The baler/bale wrapper sequentially forms a bale and then wraps the bale before formation of the next bale can be commenced. Thus, this baler/bale wrapper tends to be inefficient.

Another type of combined baler/bale wrapper comprises a baler and a bale wrapper located on a common platform. The bale is formed in the baler and discharged from the baler in a generally downwardly direction. A tailgate of the baler is opened in a generally rearwardly upwardly direction for facilitating discharge of the bale from the baler. The bale is discharged from the baler onto a wrapping table of the bale wrapper, and when the bale has been received onto the wrapping table of the bale wrapper the table is urged in a generally upwardly rearwardly direction into a bale forming area where the bale is rotated on the wrapping table for wrapping of the bale in the bale wrapping area. This baler/bale wrapper would tend to be relatively complex, and by virtue of the fact that the wrapping table of the bale wrapper must be moved backwardly and forwardly between the baler and the bale wrapper would be subject to failure, and require relatively high maintenance. Furthermore, the baler/bale wrapper would tend to be relatively inefficient.

A further type of baler/bale wrapper comprises a baler and a bale wrapper located on a common platform. The bale is formed in the baler, and when formed the baler is urged in a generally rearwardly upwardly direction for discharging the bale downwardly from the baler onto the bale wrapper. When the bale has been discharged onto the bale wrapper, the baler is then urged forwardly downwardly into a bale forming position. By virtue of the fact that the baler must be moved rearwardly and forwardly on the platform, this baler/bale wrapper would be relatively complex and would tend to require significant maintenance. Additionally, this type of baler/bale wrapper would tend to be relatively inefficient.

There is therefore a need for a baler/bale wrapper which overcomes these problems.

SUMMARY OF THE INVENTION

The present invention is directed towards providing such a baler/bale wrapper.

According to the invention there is provided a combined baler/bale wrapper for forming and wrapping a cylindrical bale of material with wrapping material, the baler/bale wrapper comprising a baler for forming a bale, the baler having a bale forming chamber within which the bale is formed, a bale wrapping means for receiving the bale from the baler for wrapping thereof, and a transfer means for transferring the bale from the baler to the bale wrapping means, wherein the transfer means transfers the bale in a generally upwardly outwardly direction from the bale forming chamber to the bale wrapping means.

Preferably, the transfer means transfers the bale upwardly outwardly of the bale forming chamber onto the bale wrapping means.

Advantageously, the transfer means transfers the bale from the bale forming chamber along a locus of transfer extending in a general direction between a vertical direction and a horizontal direction. Preferably, the locus of transfer along which the transfer means transfers the bale from the bale forming chamber extends in a generally radial direction. Ideally, the locus of transfer along which the transfer means transfers the bale from the bale forming chamber is a generally arcuate locus.

In one embodiment of the invention the baler is a fixed chamber baler.

In another embodiment of the invention the transfer means comprises a portion of the baler, the said portion of the baler forming the transfer means being moveable relative to the baler for urging the bale from the bale forming chamber. Preferably, the moveable portion of the baler which forms the transfer means is moveable from a bale forming position co-operating with the baler for defining the bale forming chamber to a discharge position for transferring the bale onto the bale wrapping means. Advantageously, the moveable portion of the baler which forms the transfer means is an integral part of the baler. Ideally, the moveable portion of the baler which forms the transfer means is a moveable lower portion of the baler.

In one embodiment of the invention the moveable lower portion of the baler which forms the transfer means is pivotally mounted about a first pivot axis and is pivotal between the bale forming position and the discharge position about the first pivot axis for tipping the bale from the bale forming chamber onto the bale wrapping means.

In another embodiment of the invention the bale forming chamber is substantially cylindrical defining an inner circumferential periphery and a main central geometrical axis.

In another embodiment of the invention the main central axis defined by the bale forming chamber extends substantially horizontally.

In a further embodiment of the invention the moveable lower portion of the baler which forms the transfer means extends around the circumferential periphery of the bale forming chamber an angular distance in the range of 50° to 160°. Preferably, the moveable lower portion of the baler which forms the transfer means extends around the circumferential periphery of the bale forming chamber an angular distance in the range of 60° and 115°. Advantageously, the moveable lower portion of the baler which forms the transfer means extends around the circumferential periphery of the bale forming chamber an angular distance in the range of 70° to 90°.

In one embodiment of the invention the moveable lower portion of the baler is moveable into the bale forming chamber from the bale forming position to the discharge position. Advantageously, the moveable lower portion of the baler is moveable through the bale forming chamber from the bale forming position to the discharge position. Preferably, the moveable lower portion of the baler is moveable through the main central axis of the bale forming chamber from the bale forming position to the discharge position.

In one embodiment of the invention an inlet is provided to the bale forming chamber through which material to be baled is fed into the bale forming chamber, the inlet being located at a level such that the bale is discharged from the bale forming chamber at a level above the level of the inlet. Preferably, the inlet to the bale forming chamber defines a lower edge, and the inlet is located relative to the first pivot axis such that the lower edge of the inlet is at a level below a horizontal plane containing the first pivot axis. Advantageously, the inlet to the bale forming chamber is located at a level which is completely below the horizontal plane containing the first pivot axis.

In one embodiment of the invention an upper portion of the baler is moveable from a bale forming position co-operating with the baler for forming the bale forming chamber to a discharge position defining with the baler an open mouth to the bale forming chamber for facilitating transfer of the bale from the bale forming chamber onto the bale wrapping means. Advantageously, the moveable upper portion of the baler which is moveable from the bale forming position to the discharge position extends around the circumferential periphery of the bale forming chamber through an angular distance of up to 180°. Preferably, the moveable upper portion of the baler is moveable in a generally upwardly direction from the bale forming position to the discharge position.

In one embodiment of the invention the moveable upper portion of the baler is pivotally mounted about a second pivot axis and is pivotal about the second pivot axis between the bale forming position and the discharge position.

Advantageously, the first and second pivot axes are parallel to each other.

Preferably, the first pivot axis is parallel to the main central axis defined by the bale forming chamber.

In one embodiment of the invention the moveable upper and lower portions of the baler are sequentially operable between the bale forming position and the discharge position. Preferably, movement of the moveable upper portion from the bale forming position to the discharge position commences prior to movement of the moveable lower portion from the bale forming position to the discharge position. Advantageously, movement of the moveable lower portion of the baler from the discharge position to the bale forming position commences prior to movement of the moveable upper portion of the baler from the discharge position to the bale forming position.

Preferably, the respective first and second pivot axes are located adjacent the circumferential periphery of the bale forming chamber, and advantageously, the respective first and second pivot axes are spaced apart from each other at least 180° around the main central geometrical axis of the bale forming chamber.

In one embodiment of the invention the first pivot axis is located within an arc extending not more than 30° above, and not more than 60° below a horizontal plane containing the main central axis of the bale forming chamber. Preferably, the first pivot axis is located within an arc extending downwardly from the horizontal plane containing the main central axis of the bale forming chamber not more than 60°. Advantageously, the first pivot axis is located within an arc extending downwardly from the horizontal plane containing the main central axis at an angular distance from the said horizontal plane in the range of 30° to 40°.

In another embodiment of the invention the second pivot axis is located within an arc extending not more than 60° above, and not more than 30° below the horizontal plane containing the main central axis of the bale forming chamber. Preferably, the second pivot axis is located within an arc extending not more than 30° above, and not more than 15° below the horizontal plane containing the main central axis of the bale forming chamber. Advantageously, the second pivot axis is located within an arc extending above the horizontal plane containing the main central axis of the bale forming chamber an angular distance from the said horizontal plane in the range of 10° to 15°.

In one embodiment of the invention the first pivot axis is located closer to the bale wrapping means than the second pivot axis. Preferably, the first pivot axis is located relatively closely to the bale wrapping means.

In one embodiment of the invention the moveable lower portion of the baler which forms the transfer means comprises a lower arcuate segment which defines a part of the circumferential periphery of the bale forming chamber.

In another embodiment of the invention the upper portion of the baler comprises an upper arcuate segment which defines another part of the circumferential periphery of the bale forming chamber.

In a further embodiment of the invention the baler comprises a stationary arcuate segment for defining a part of the bale forming chamber, the stationary arcuate segment extending along the circumferential periphery between the respective upper and lower portions of the bale forming chamber. Preferably, the stationary arcuate segment extends circumferentially from the second pivot axis.

In one embodiment of the invention the respective moveable upper and lower portions of the baler terminate relatively closely to each other adjacent the first pivot axis. Preferably, the respective moveable upper and lower portions of the baler substantially abut each other adjacent the first pivot axis.

In one embodiment of the invention a first urging means is provided for urging the moveable lower portion of the baler between the bale forming position and the discharge position. Preferably, the first urging means acts between the moveable lower portion of the baler and the baler. Advantageously, the first urging means comprises a first ram.

In another embodiment of the invention a second urging means is provided for urging the moveable upper portion of the baler between the bale forming position and the discharge position. Preferably, the second urging means acts between the moveable upper portion and the moveable lower portion of the baler. Advantageously, the second urging means comprises a second ram.

In another embodiment of the invention the baler comprises a bale forming means for forming the material into a bale.

In a further embodiment of the invention the bale forming means comprises a plurality of bale forming rollers rotatably carried in the baler and arranged around the main central axis to define the circumferential periphery of the bale forming chamber.

In a still further embodiment of the invention the bale forming rollers define respective secondary geometrical axes which extend parallel to the main central axis defined by the bale forming chamber.

In one embodiment of the invention a drive transmission means is provided for rotating the bale forming rollers for forming the bale in the bale forming chamber.

In one embodiment of the invention each of the upper and lower moveable portions of the baler carry corresponding ones of the bale forming rollers. Preferably, the stationary arcuate segment carries corresponding ones of the bale forming rollers.

In one embodiment of the invention the transfer means is moveable into the bale forming chamber for urging the bale from the bale forming chamber to the bale wrapping means. Preferably, the transfer means traverses through the bale forming chamber for urging the bale from the bale forming chamber to the bale wrapping means. Advantageously, the transfer means traverses through the main central axis defined by the bale forming chamber for urging the bale from the bale forming chamber.

In a further embodiment of the invention the baler/bale wrapper comprises a chassis. Preferably, the baler is mounted on the chassis. Advantageously, the bale wrapping means is mounted on the chassis.

In one embodiment of the invention the chassis defines a main central longitudinal axis extending along the chassis in the general direction of forward motion of the chassis. Preferably, the main central axis defined by the bale forming chamber extends transversely of the main central longitudinal axis. Advantageously, the main central longitudinal axis extends substantially horizontally.

In one embodiment of the invention the bale wrapping means is a two axes bale wrapping means comprising a wrapping material dispensing means for dispensing wrapping material onto the bale for wrapping thereof, whereby the bale is rotated about a first wrapping axis, and one of the bale and the dispensing means is rotated about a second wrapping axis at an angle to the first wrapping axis for dispensing wrapping material onto the bale for wrapping thereof.

In another embodiment of the invention the bale wrapping means comprises a bale support means for receiving the formed bale from the baler, and for rotating the bale about the first wrapping axis, which coincides substantially with the central geometrical axis of the bale, and one of the bale support means and the dispensing means is rotatable about the second wrapping axis simultaneously while the bale is being rotated about the first wrapping axis for causing the wrapping material to be drawn from the dispensing means and wrapped onto the bale.

In a further embodiment of the invention the bale support means is located for receiving the bale from the baler with the central axis of the bale parallel to the main central axis defined by the bale forming chamber. Preferably, the bale support means rotates the bale about the first wrapping axis parallel to the main central axis defined by the bale forming chamber. Advantageously, the first wrapping axis extends substantially horizontally. Ideally, the first wrapping axis extends transversely of the main central longitudinal axis defined by the chassis.

In another embodiment of the invention the bale support means comprises a first bale supporting roller and a second bale supporting roller parallel to and spaced apart from the first bale supporting roller for receiving and supporting the bale thereon and for rotating the bale about the first wrapping axis. Preferably, the respective first and second bale supporting rollers are rotatable about their respective geometric axes for rotating the bale about the first wrapping axis. Advantageously, the geometric axes of the respective bale supporting rollers extend parallel to the main central axis defined by the bale forming chamber. Ideally, the first bale supporting roller is located closer to the first pivot axis of the moveable lower portion of the baler than the second bale supporting roller. Preferably, the first bale supporting roller is located adjacent the baler.

In one embodiment of the invention the first bale supporting roller is located adjacent the first pivot axis of the lower moveable segment of the baler.

In another embodiment of the invention an intermediate transfer roller is located between the first bale supporting roller and the baler for supporting the bale during transfer from the baler to the bale wrapping means. Preferably, the intermediate transfer roller is located adjacent the first bale supporting roller. Advantageously, the intermediate transfer roller is located adjacent the first pivot axis. Ideally, the intermediate transfer roller extends parallel to the first pivot axis.

In one embodiment of the invention the first bale supporting roller is moveable in a generally downwardly direction from a bale wrapping position co-operating with the second bale supporting roller for supporting and rotating the bale during wrapping, to a bale receiving position for accommodating transfer of the bale from the baler onto the bale support means. Preferably, the first bale supporting roller is moveable from the bale receiving position to the bale wrapping position when the bale has been transferred from the baler onto the bale support means. Advantageously, the first bale supporting roller is co-operable with the moveable lower portion of the baler so that as the moveable lower portion of the baler is being moved from the bale forming position to the discharge position the first bale supporting roller is moved from the bale wrapping position to the bale receiving position. Ideally, the first bale supporting roller is co-operable with the moveable lower portion of the baler so that as the moveable lower portion of the baler is being moved from the discharge position to the bale forming position, the first bale supporting roller is moved from the bale receiving position to the bale wrapping position.

In one embodiment of the invention the first bale supporting roller is operably connected to the moveable lower portion of the baler by a connecting means for moving the first bale supporting roller between the bale wrapping position and the bale receiving position as the moveable lower portion of the baler is being moved between the bale forming position and the discharge position, respectively.

Preferably, the first bale supporting roller in the bale receiving position is at a level below the level of the first pivot axis of the moveable lower portion of the baler for facilitating transfer of a bale from the baler onto the bale wrapping means.

In one embodiment of the invention the geometric axes of the first and second bale supporting rollers define a common plane when the first and second bale supporting rollers are in the bale wrapping position.

In another embodiment of the invention the common plane defined by the respective geometric axes of the first and second bale supporting rollers when the first and second bale supporting rollers are in the bale wrapping position is a substantially horizontal plane.

In a further embodiment of the invention the common plane defined by the geometric axes of the first and second bale supporting rollers when the first and second bale supporting rollers are in the bale wrapping position is at a level just above or just below a horizontal plane containing the first pivot axis of the moveable lower portion of the baler.

In another embodiment of the invention the dispensing means comprises at least one wrapping material dispenser from which wrapping material is dispensed onto the bale on the bale support means, and a carrier means for carrying each wrapping material dispenser, the carrier means defining a locus of travel extending around the second wrapping axis, and each wrapping material dispenser is moveable along the locus of travel around the second wrapping axis for dispensing the wrapping material onto the bale for wrapping thereof. Preferably, the locus of travel defined by the carrier means lies in a vertical plane, which extends in a generally upwardly downwardly direction. Advantageously, the locus of travel defined by the carrier means lies in a vertical plane. Ideally, the locus of travel defined by the carrier means lies in a plane which extends transversely of the main central longitudinal axis.

In one embodiment of the invention the locus of travel defined by the carrier means defines the second wrapping axis about which each wrapping material dispenser is revolvable for dispensing wrapping material onto the bale.

In another embodiment of the invention the second wrapping axis extends substantially horizontally. Preferably, the second wrapping axis extends substantially parallel to the main central longitudinal axis defined by the chassis.

In one embodiment of the invention a pair of wrapping material dispensers are carried on the carrier means at spaced apart locations around the locus of travel defined by the carrier means. Preferably, the wrapping material dispensers are located at 180° centres around the locus of travel defined by the carrier means.

In another embodiment of the invention the carrier means is rotatable about the second wrapping axis for revolving each wrapping material dispenser about the second wrapping axis along the locus of travel. Preferably, the carrier means defines the second wrapping axis.

In one embodiment of the invention the second wrapping axis extends perpendicularly to the first wrapping axis.

In one embodiment of the invention the carrier means comprises a carrier ring. Preferably, the carrier ring is rotatable about the second wrapping axis. Advantageously, the carrier ring is supported on at least two carrier rollers, at least one of which is a drive roller for rotating the carrier ring. Advantageously, a pair of spaced apart locating rollers are provided for locating the carrier ring. Preferably, the respective locating rollers are located above the carrier rollers.

Advantageously, the carrier ring extends in a substantially vertical plane.

Preferably, a first drive means is provided for rotating at least one of the first and second bale supporting rollers. Advantageously, a second drive means is provided for urging the or each wrapping material dispenser along the locus of travel about the second wrapping axis. Preferably, the first and second drive means are synchronised so that the rotational speeds of the bale supporting rollers and each wrapping material dispenser are synchronised for wrapping the bale.

In one embodiment of the invention the second bale supporting roller is moveable downwardly from the bale wrapping position for facilitating dispensing of a wrapped bale from the bale support means. Preferably, the second bale supporting roller is carried on a second roller carrier means which is pivotal from a first position with the second bale supporting roller in the bale wrapping position to a second position for urging the second bale supporting roller from the bale supporting position for dispensing the wrapped bale from the bale support means.

In one embodiment of the invention the baler and the bale wrapper are located relative to each other so that the horizontal distance between a vertical plane containing the main central axis of the bale forming chamber and a vertical plane containing the first wrapping axis lies in the range of a distance corresponding to the diameter of the bale plus 300 mm and a distance corresponding to the diameter of the bale plus 800 mm.

Additionally, the invention provides a combined baler/bale wrapper for forming and wrapping a cylindrical bale of material with wrapping material, the baler/bale wrapper comprising a baler for forming a bale, the baler having a bale forming chamber within which the bale is formed, a bale wrapping means located in a bale wrapping area for receiving the bale from the baler for wrapping thereof, and a transfer means for transferring the bale from the baler to the bale wrapping means, wherein the transfer means transfers the bale directly from the bale forming chamber to the bale wrapping area for wrapping thereof. Preferably, the transfer means transfers the bale in a generally upwardly outwardly direction from the bale forming chamber to the bale wrapping area. Advantageously, the transfer means transfers the bale upwardly outwardly of the bale forming chamber onto the bale wrapping area.

Further the invention provides a combined baler/bale wrapper for forming and wrapping a cylindrical bale of material in a wrapping material, the baler/bale wrapper comprising a baler for forming a bale, the baler having a bale forming chamber within which the bale is formed, a bale wrapping means for receiving the bale from the bale forming chamber for wrapping thereof, and a transfer means for transferring the bale from the bale forming chamber to the bale wrapping means, wherein the transfer means is operable to traverse into the bale forming chamber for urging the bale from the bale forming chamber.

The invention also provides a combined baler/bale wrapper for forming and wrapping a cylindrical bale of material with wrapping material, the baler/bale wrapper comprising a baler for forming a bale, and a bale wrapping means for receiving the bale from the baler for wrapping thereof, wherein the bale wrapping means comprises a bale support means for receiving the bale from the baler and for rotating the bale about a first wrapping axis coinciding with the central geometrical axis of the bale, and a wrapping material dispensing means for dispensing the wrapping material onto the bale for wrapping thereof, one of the bale supporting means and the dispensing means being rotatable about a second wrapping axis at an angle to the first wrapping axis simultaneously while the bale is being rotated about the first wrapping axis for causing the wrapping material to be drawn from the dispensing means and wrapped onto the bale.

Additionally, the invention provides a combined baler/bale wrapper for forming and wrapping a cylindrical bale of material with wrapping material, the baler/bale wrapper comprising a baler for forming a bale, the baler having a bale forming chamber within which the bale is formed, a bale wrapping means for receiving the bale from the baler for wrapping thereof, and a transfer means for transferring the bale from the baler to the bale wrapping means, wherein the transfer means transfers the bale directly from the bale forming chamber to the bale wrapping means for wrapping thereof.

The advantages of the baler/bale wrapper according to the invention are many. A particularly important advantage of the invention is that it provides an efficient baler/bale wrapper. In particular, the baler/bale wrapper according to the invention is a relatively compact baler/bale wrapper, and in particular, the overall length of the baler/bale wrapper from front to back is minimised. By virtue of the fact that the transfer means for transferring the bale from the bale forming chamber to the bale wrapping means urges the bale upwardly and outwardly from the bale forming chamber permits direct transfer of the bale from the bale forming chamber onto the bale wrapping means. This, thus, minimises the time required to transfer the bale from the bale forming chamber to the bale wrapping means, and in particular, minimises the downtime of the baler and the bale wrapping means. In other words, the time during which the baler is non-operational from the point of view of forming bales, and the time during which the bale wrapping means is non-operational from the point of view of wrapping bales is minimised. Additionally, the fact that the bale is transferred upwardly and outwardly from the bale forming chamber and is directly transferred from the bale forming chamber onto the bale wrapping means permits the bale wrapping means to be located relatively closely to the baler, and thus minimises the overall length of the combined baler/ bale wrapper according to the invention. Additionally, by virtue of the fact that the transfer means transfers the bale upwardly outwardly from the bale forming chamber, the bale is discharged from the bale forming chamber at a relatively high level, and at a significantly higher level than is otherwise possible from balers of combined baler/bale wrappers known heretofore. This, thus, permits the bale wrapping means to be located on the chassis at a relatively higher level than would otherwise be possible. This, thus, further facilitates direct transfer of the bale from the bale forming chamber to the bale wrapping means, and thereby further facilitates in locating the bale wrapping means relatively closely to the baler. Furthermore, by virtue of the fact that the transfer means transfers the bale upwardly outwardly from the bale forming chamber the bale is discharged from the bale forming chamber at a level which is higher than the inlet through which material to be baled is fed into the baler. This permits the baler and the bale wrapping means to be mounted on the chassis relative to each other so that the bale wrapping means and the baler are located relatively closely to each other, and furthermore, are located at levels relative to each other which are ideally suited for direct transfer of the bale from the bale forming chamber onto the bale wrapping means. Additionally, this permits the baler to be located on the chassis with the inlet to the bale forming chamber located at a level suitable for picking up material to be baled from the ground, while at the same time also facilitating location of the bale wrapping means on the chassis for receiving the bale directly from the bale forming chamber onto the bale wrapping means.

By urging the bale from the bale forming chamber in a generally upward direction which is between a generally vertical direction and a generally horizontal direction, a particularly efficient construction of a baler/bale wrapper is provided. By urging the bale from the bale forming chamber onto the bale wrapping means in this direction the bale can be transferred efficiently and smoothly onto the bale wrapping means. By urging the bale radially outwardly of the bale forming chamber, smooth efficient transfer of the bale is further accommodated. By urging the bale through an arc in a general upward direction between a general vertical direction and a general horizontal direction from the bale forming chamber onto the bale wrapping means provides for a particularly efficient construction of baler, and thus, particularly efficient construction of combined baler/bale wrapper.

The fact that the transfer means for transferring the bale from the baler to the bale wrapping means is arranged to move inwardly into the bale forming chamber and traverse through the bale forming chamber provides a further advantage of the invention, in that the bale can be urged in a general upward direction between a generally vertical direction and a generally horizontal direction from the bale forming chamber directly onto the bale wrapping means. This further facilitates in locating the bale wrapping means close to the baler, and thereby minimising the overall length of the combined baler/bale wrapper. A particularly important advantage of the invention is achieved when the transfer means for transferring the bale from the bale forming chamber to the bale wrapping means is provided by a moveable portion of the baler, and in particular, by a moveable lower portion of the baler. By pivoting the moveable lower portion of the baler so that the moveable lower portion of the baler is pivotal about the first pivot axis between the bale forming position and the discharge position provides a particularly efficient construction of baler/bale wrapper, which further enhances the efficiency and compactness of the baler/bale wrapper.

By providing an upper portion of the baler moveable between the bale forming position and the discharge position so that when the upper portion is in the discharge position an open mouth is defined to the bale forming chamber through which the bale is transferred from the bale forming chamber to the bale wrapping means, a particularly efficient construction of combined baler/bale wrapper is provided. By having the upper portion of the baler moveable upwardly from the bale forming position to the discharge position the upper portion of the baler when in the discharge position does not interfere in any way with a bale on the bale wrapping means, which would otherwise arises in known combined baler/bale wrappers where a portion of the baler is pivoted rearwardly for facilitating discharge of the bale from the bale forming chamber, if the bale wrapping means were not located at a distance from the baler. By virtue of the fact that the upper portion of the baler is moveable upwardly between the bale forming position and the discharge position, the bale wrapping means can be located significantly more closely to the baler than in baler/bale wrappers known heretofore, and this, thus, facilitates in direct transfer of the bale from the bale forming chamber to the bale wrapping means. Additionally, providing the moveable upper portion of the baler moveable in a generally upwardly direction facilitates in discharging the bale from the bale forming chamber in the generally upwardly outwardly direction, and in particular, facilitates in the discharge of the bale in a general upward direction between a generally vertical direction and a generally horizontal direction, and in particular, through an arc in such direction.

By pivotally mounting the moveable upper portion of the baler so that it is pivotal about the second pivot axis provides a particularly efficient construction which minimises the time required in operating the moveable upper portion and the moveable lower portion between the bale forming position and the discharge position for discharging a bale from the bale forming chamber to the bale wrapping means. Additionally, the time required for returning the moveable upper and lower portions of the baler from the discharge position to the bale forming position is likewise minimised, thereby providing for a relatively fast, efficient transfer of the bale from the bale forming chamber to the bale wrapping means and thus maximising the time during which the baler is operating to form bales.

Locating of the bale wrapping means close to the baler is further facilitated when the moveable upper portion is pivotally mounted about the second pivot axis, and is pivoted upwardly from the bale forming position to the discharge position, and the second pivot axis is located adjacent the circumferential periphery of the bale forming chamber and within an arc extending upwardly from a horizontal plane containing the main central axis of the bale forming chamber of not more than 60° and preferably not more than 30°, and in particular, when the second pivot axis is located at an angular distance from the said horizontal plane containing the main central axis of the bale forming chamber in the range of 10° to 15°.

The advantages achieved by transferring the bale in the general upward direction which is between a generally vertical direction and a generally horizontal direction from the bale forming chamber onto the bale wrapping means may be achieved by other suitable transfer means which would operate for transferring the bale in such direction from the bale forming chamber. In general, it is envisaged that such a transfer means would be moveable into the bale forming chamber for transferring the bale, and in general, would traverse through at least a portion of the bale forming chamber for transferring the bale from the bale forming chamber to the bale wrapping means, and in particular, for transferring the bale in the general upward direction between a generally vertical direction and a generally horizontal direction from the bale forming chamber. While the provision of the transfer means as an integral portion of the baler is a preferred form of transfer means, nonetheless, it is envisaged that the transfer means may be provided by a transfer means which would not necessarily form part of the bale forming chamber. Such a transfer means may be provided externally or within the bale forming chamber, and would be moveable typically into the bale forming chamber to traverse at least a portion of the bale forming chamber for transferring the bale from the bale forming chamber to the bale wrapping means.

Providing the transfer means as an integral part of the baler provides an important advantage over prior art baler/bale wrappers, and in particular, prior art baler/bale wrappers in which a lower portion of the bale forming chamber is pivoted downwardly for permitting discharge of the bale in a generally downwardly outwardly direction of the bale forming chamber. In such baler/bale wrappers the bale having been discharged from the baler is at a relatively low level, and thus a separate transfer means is required for transferring the bale from the lower level upwardly onto the bale wrapper. This, thus, requires a considerable amount of additional space to be left between the baler and the bale wrapper, thus adding to the overall length of the baler/bale wrapper. By providing the transfer means as an integral part of the baler, or as a separate part which urges the bale in the general upward direction between a generally vertical direction and a generally horizontal direction from the bale forming chamber, the bale is transferred directly from the bale forming chamber onto the bale wrapping means, and thus the speed of operation of the baler/bale wrapper is significantly greater than baler/bale wrappers known heretofore.

A further advantage of the invention is achieved by the arrangement of the bale wrapping means, and in particular, the arrangement of the bale wrapping means whereby the wrapping material dispenser is carried on a carrier means which defines a locus of travel along which each wrapping material dispenser travels about a horizontal second wrapping axis which extends parallel to the main longitudinal axis defined by the chassis. This facilitates in minimising the spacing required between the baler and the bale wrapping means. If the wrapping material dispensing means comprised one or more wrapping material dispensers which were revolvable about a vertical second wrapping axis, a significant space would be required between the baler and the bale wrapping means for accommodating passage of each wrapping material dispenser between the baler and the bale wrapping means.

By urging the bale in a general upward direction between a generally vertical direction and a generally horizontal direction from the bale forming chamber the baler and the bale wrapping means can be located at relative heights to each other for facilitating picking up material to be baled from the ground into the baler, and also for facilitating wrapping of the formed bale, and in particular, for facilitating an arrangement whereby the wrapping material dispensers can be revolved around the bale through a vertical plane. This further facilitates locating of the bale wrapping means adjacent the baler. By virtue of the fact that the wrapping material dispensers are revolved through a vertical plane about the bale when the bale is being rotated on the bale supporting rollers, there is no need for either the bale supporting rollers to be revolved about a vertical axis, nor is there a need for wrapping material dispensers to be revolved about a vertical axis, both of which arrangements of either the bale supporting rollers or the wrapping material dispensers would require the bale wrapping means to be spaced apart from the baler a distance significantly greater than can be achieved in the baler/bale wrapper of the present invention. To achieve this, the moveable lower portion traverses into the bale forming chamber, and this is accommodated by virtue of the fact that the moveable upper portion pivots upwardly from the bale forming position to the discharge position in order to form the open mouth for accommodating discharge of the bale from the bale forming chamber.

Furthermore, by virtue of the fact that the bale is transferred directly from the bale forming chamber of the baler to the bale wrapping area onto the bale wrapping means by the transfer means the disadvantages of the prior art baler/bale wrappers, in general, are overcome. The baler/bale wrapper according to the invention is efficient, permits wrapping and forming of respective bales to be carried out simultaneously, the speed of transfer of the bale from the bale forming chamber to the bale wrapper is maximised, thus minimising delay time between the formation of respective bales and the wrapping of respective bales, and additionally, a particularly compact baler/bale wrapper is provided in which the overall length of the baler/bale wrapper is minimised. The baler/bale wrapper according to the invention also is relatively simple, less complex than prior art bale wrappers with minimum moving parts.

A further advantage of the baler/bale wrapper according to the invention is that the bale is positively displaced from the bale forming chamber, rather than being discharged under gravity as is the case in many balers known heretofore. This is a particularly important advantage in combined baler/bale wrappers, since if the bale were to stick or jam in the bale forming chamber as can occur in balers known heretofore, particularly where the bale is discharged from the bale forming chamber under gravity, serious damage could occur to the baler/bale wrapper.

BRIEF DESCRIPTION OF THE DRAWINGS

The invention will be more clearly understood from the following description of some preferred embodiments thereof which are given by way of example only with reference to the accompanying drawings in which:

FIG. 9 is a schematic side elevational view of a combined baler/bale wrapper according to another embodiment of the invention, FIG. 14 is a plan view of a detail of the baler/bale wrapper of FIG. 9.

DETAILED DESCRIPTION OF THE INVENTION

Figure 1:
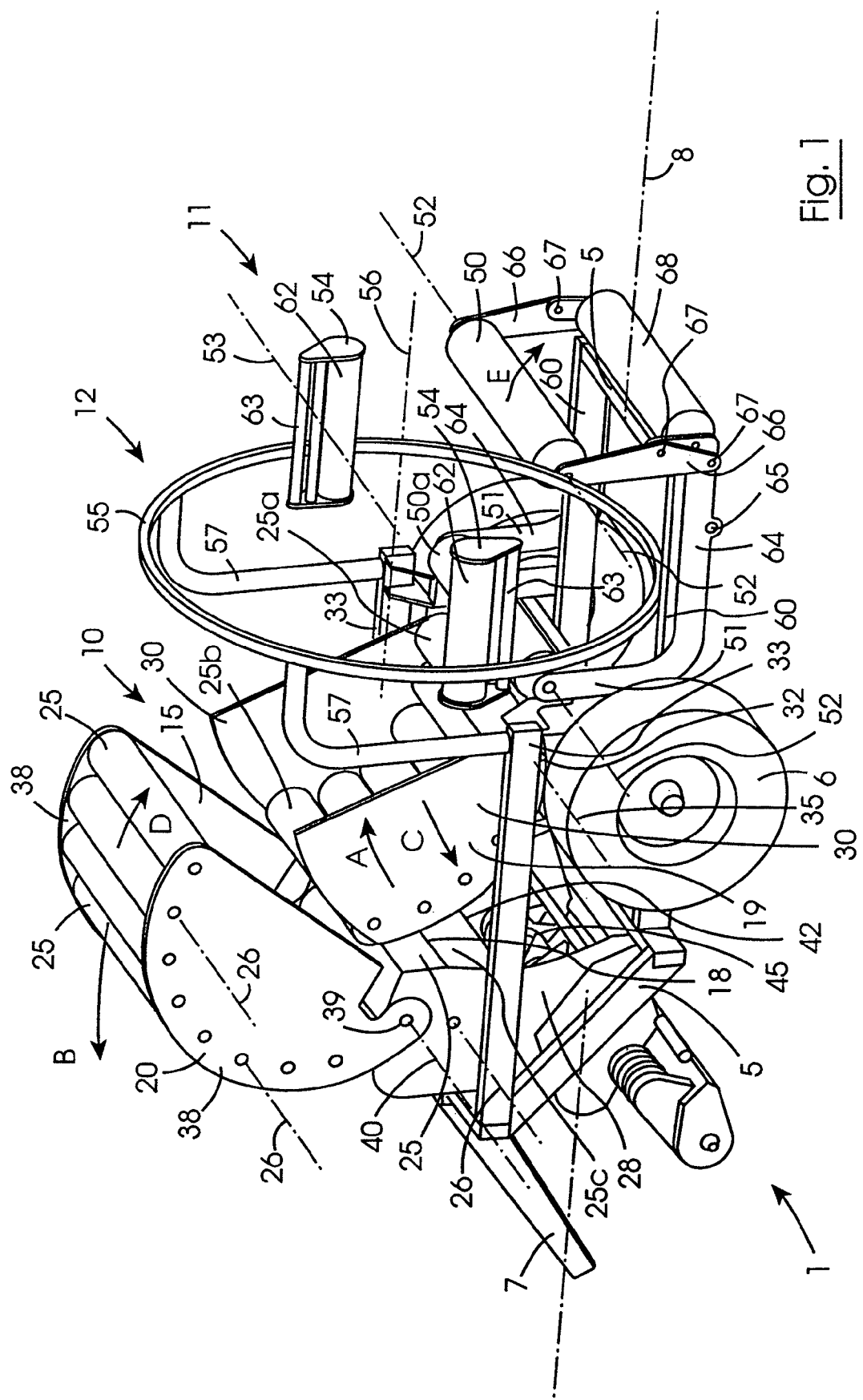
FIG. 1 is a perspective view of a combined baler/bale wrapper according to the invention.
Figure 2:
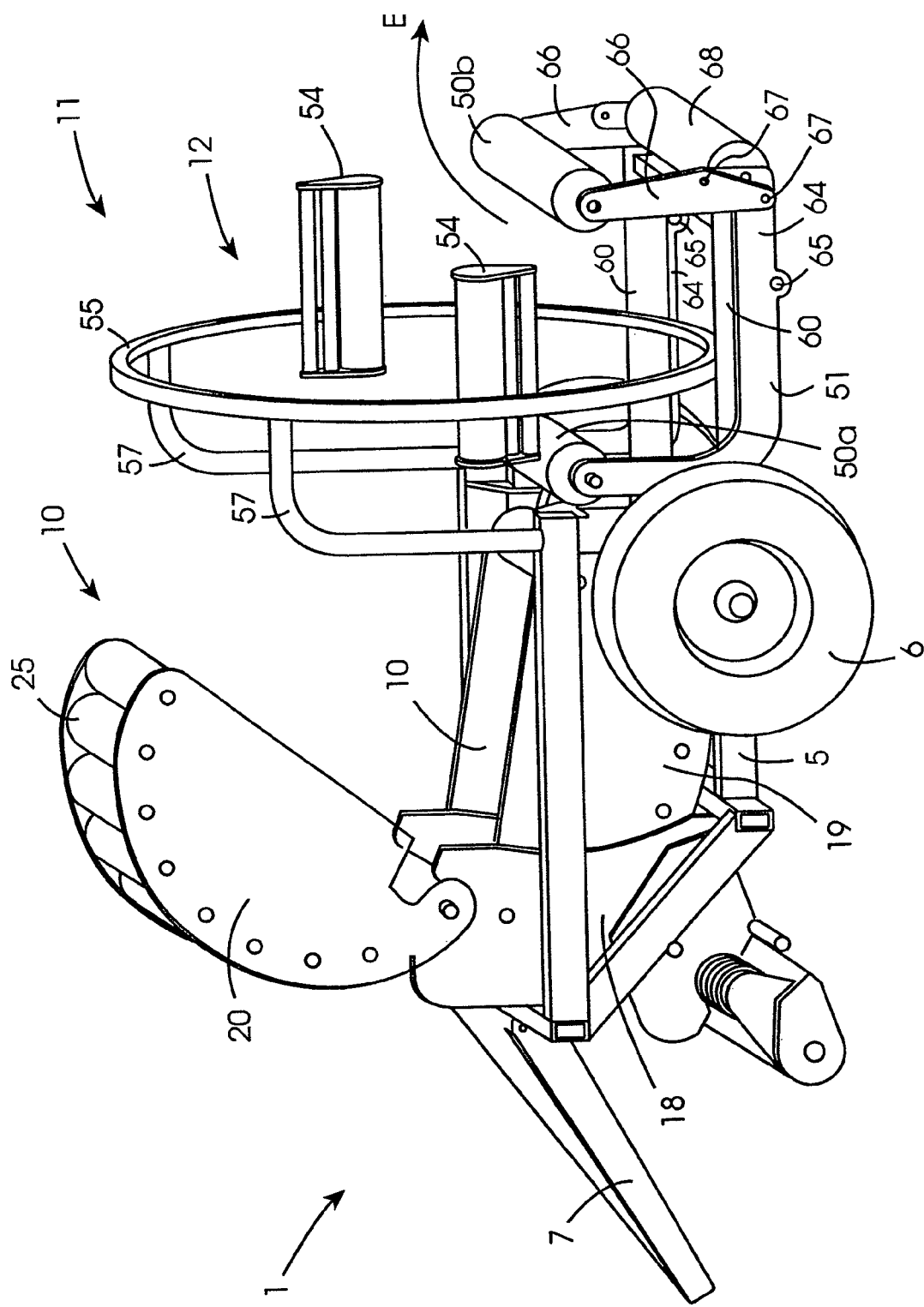
FIG. 2 is a side perspective view of the baler/bale wrapper of FIG. 1.
Figure 3:
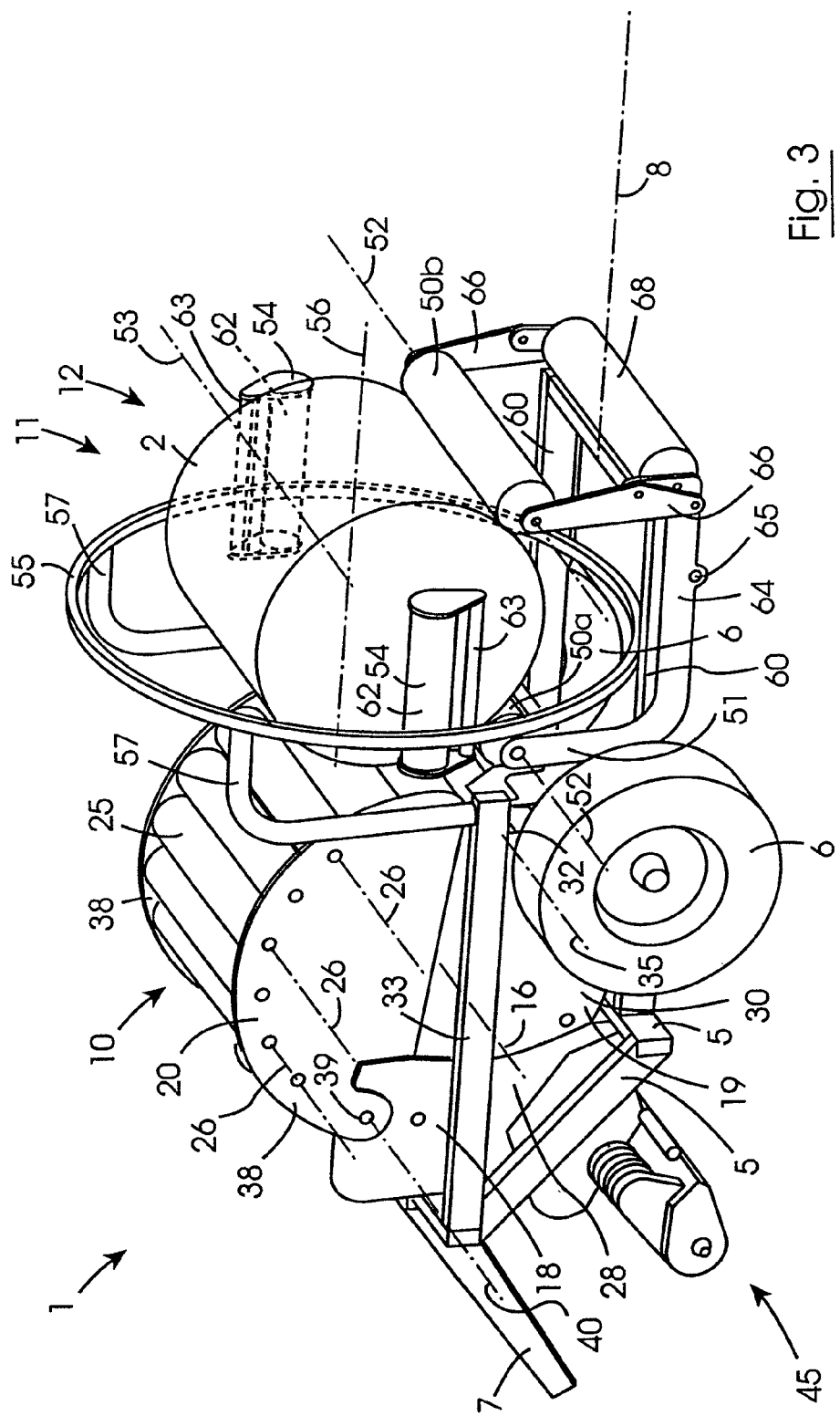
FIG. 3 is a perspective view of the baler/bale wrapper of FIG. 1 in use.
Figure 4:
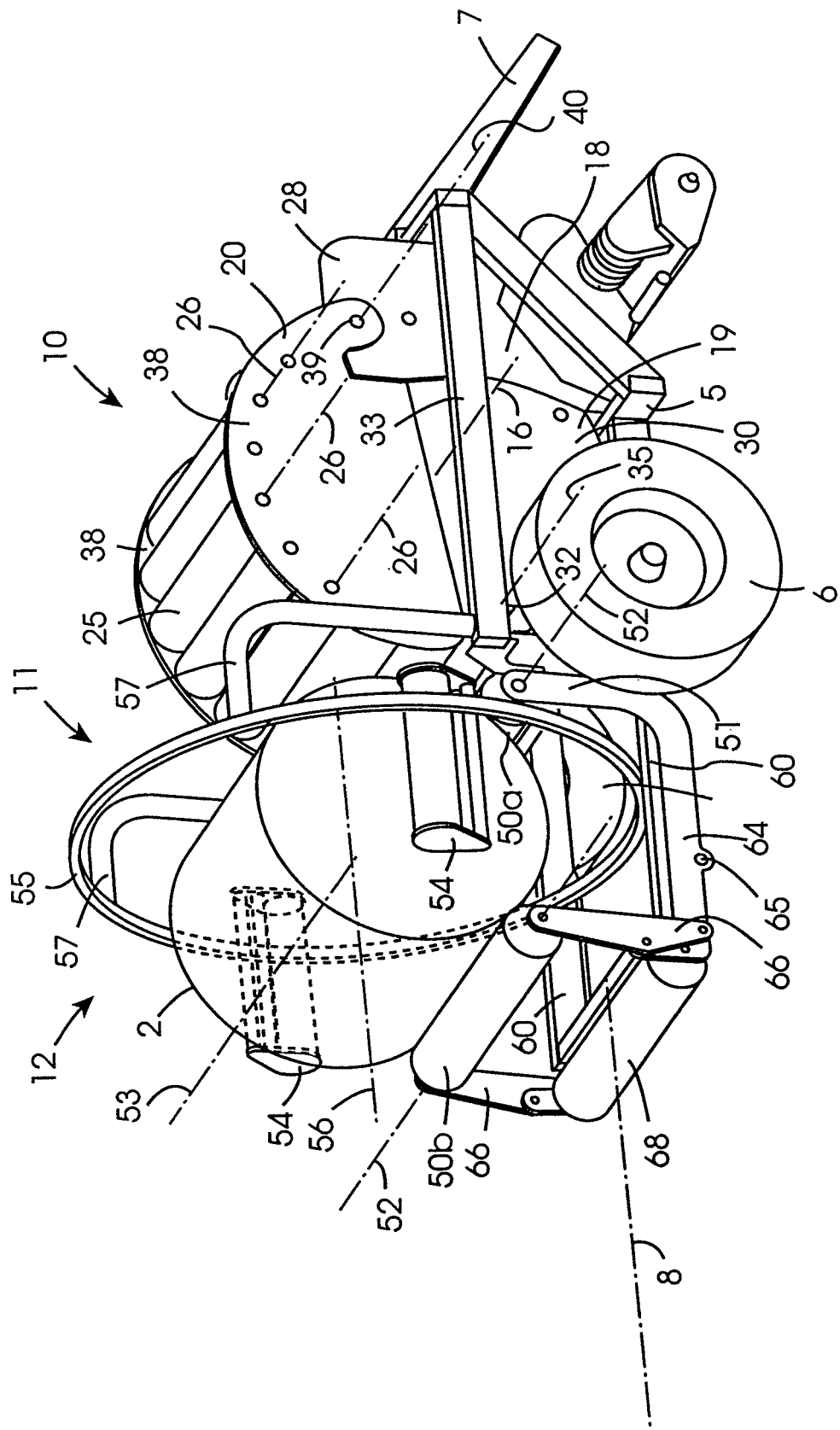
FIG. 4 is another perspective view of the baler/bale wrapper of FIG. 1 also in use from the other side to that illustrated in FIGS. 1 to 3.
Figure 5:
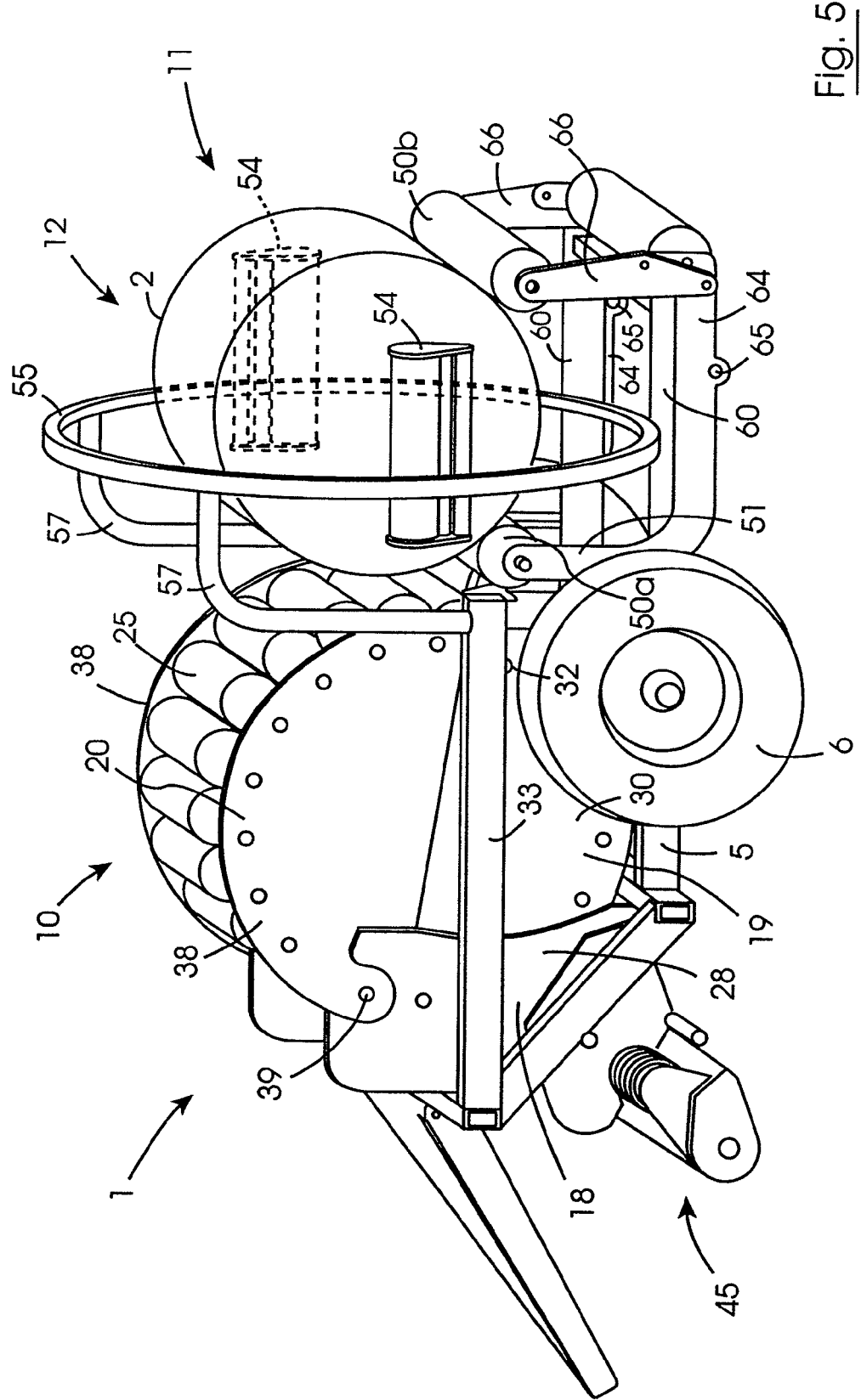
FIG. 5 is another side perspective view of the baler/bale wrapper of in use.

Referring to the drawings and initially to FIGS. 1 to 8 thereof there is illustrated a combined baler/bale wrapper according to the invention indicated generally by the reference numeral 1 for forming and wrapping a cylindrical bale of fodder material, typically, silage, the bale being of the type typically referred to as a round bale. In this embodiment of the invention the bale formed is of diameter approximately 1.25 meters and axial length of approximately 1.25 meters. A bale 2 is illustrated diagrammatically in FIGS. 3 to 6 being wrapped as will be described below. The baler/bale wrapper 1 is particularly suitable for towing behind a towing vehicle, such as, for example, a tractor, and is powered by the tractor, although the baler/bale wrapper could be self propelled and self powered. The baler/bale wrapper 1 comprises a chassis 5 which is carried on a pair of rotatably mounted ground engaging wheels 6. A framework 7 extending forwardly from the chassis 5 terminates in a hitch (not shown) for hitching the baler/bale wrapper 1 to a tractor (not shown). The chassis 5 defines a main central longitudinal axis 8 which extends centrally, horizontally and longitudinally in the general direction of forward motion of the chassis 5.

A baler indicated generally by the reference numeral 10 for sequentially forming round bales 2 of silage therein is mounted on the chassis 5 to the forward end thereof. A bale wrapping means, namely, a bale wrapper indicated generally by the reference numeral 11 for wrapping each bale formed by the baler 10 is located in a bale wrapping area 12 on the chassis 5 rearwardly of and adjacent the baler 10, and in line therewith so that bales 2 formed in the baler 10 can be readily transferred directly from the baler 10 to the bale wrapper 11 as will be described below.

The baler 10 is a fixed chamber baler, and defines a cylindrical bale forming chamber 15 within which the bales 2 are sequentially formed. The bale forming chamber 15 defines a main central geometrical axis 16, and the baler 10 is located on the chassis 5 with the main central axis 16 extending horizontally and transversely of the main central longitudinal axis 8 when viewed in plan. The baler 10 is formed in three portions, namely, a stationary arcuate segment 18, a moveable lower portion provided by a lower arcuate segment 19 and a moveable upper portion provided by an upper arcuate segment 20, the three of which co-operate together in a bale forming position to define the bale forming chamber 15, see FIGS. 3 to 6. The respective arcuate segments 18, 19 and 20 each carry bale forming means, namely, a plurality of bale forming rollers 25 for rotating the material about the main central axis 16 for forming the bale in the bale forming chamber 15. The bale forming rollers 25 define the inner circumferential periphery of the bale forming chamber, and define respective secondary axes 26 which extend parallel to the main central axis 16. The bale forming rollers 25 are rotatable about their corresponding secondary axes 26 for rotating the material in the bale forming chamber 15 for forming the bale. A drive transmission (not shown) is provided for transmitting drive from a power take-off shaft of the tractor to the bale forming rollers 25 for rotating the bale forming rollers 25.

A pair of spaced apart side walls 28 extend upwardly from the chassis 5 for forming the stationary segment 18. Three of the bale forming rollers 25 extend between and are rotatably carried on the side walls 28 in bearings (not shown). The lower segment 19 comprises a pair of spaced apart lower side walls 30 which rotatably carry six of the bale forming rollers 25 in bearings (not shown). The lower segment 19 forms a transfer means, and is pivotally carried on a first pivot shaft 32 which in turn is carried on respective side members 33 of the chassis 5 for transferring the bale 2 directly from the bale forming chamber 15 to the bale wrapping area 12 onto the bale wrapper 11. The first pivot shaft 32 defines a first pivot axis 35, and the lower segment 19 is pivotal about the first pivot axis 35 through a generally upwardly extending arc in the direction of the arrow A from the bale forming position to a discharge position for urging a formed bale 2 generally upwardly, rearwardly from the bale forming chamber 15 directly to the bale forming area 12 onto the bale wrapper 11. In other words, the bale is urged through a locus of discharge in an arc, in a general upward direction which is between a general vertical direction and a general horizontal direction from the bale forming chamber 15 onto the bale wrapper 11. The first pivot axis 35 extends parallel to the main central axis 16. The lower side walls 30 are pivotally carried on the first pivot shaft 32, and the first pivot shaft 32 rotatably carries one of the bale forming rollers 25 of the lower segment 19, namely, the bale forming roller 25a.

The upper segment 20 comprises a pair of upper side walls 38 between which eight of the bale forming rollers 25 are rotatably carried in bearings (not shown). The upper segment 20 is pivotally carried on a second pivot shaft 39 which extends between and is carried on the side walls 28 of the stationary segment 18, and which defines a second pivot axis 40 extending parallel to the main central axis 16. The upper segment 20 is pivotal in a generally upwardly forwardly direction from the bale forming position in the direction of the arrow B to a discharge position illustrated in FIGS. 1 and 2 whereby the upper arcuate segment 20 defines an open mouth with the lower segment 19 for facilitating transfer of a formed bale from the bale forming chamber 15 to the bale wrapper 11.

Accordingly, when the lower segment 19 and the upper segment 20 are in the bale forming position defining with the stationary segment 18 the bale forming chamber 15, the respective stationary, lower and upper segments 18, 19 and 20 define the bale forming chamber 15 which is of fixed constant size.

Figure 6:
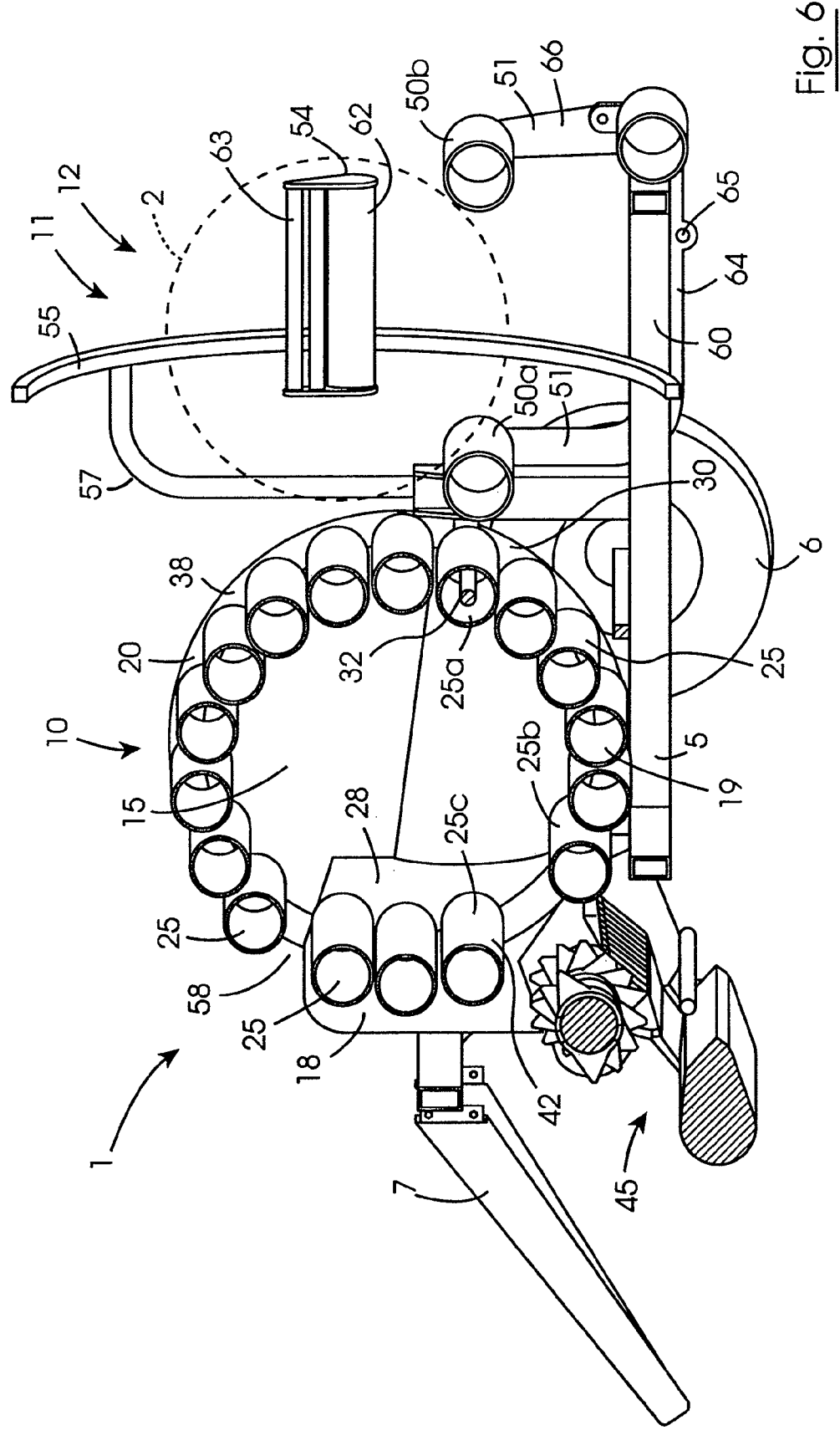
FIG. 6 is a partly cut away cross-sectional perspective view of the baler/bale wrapper of FIG. 1.
Figure 7:
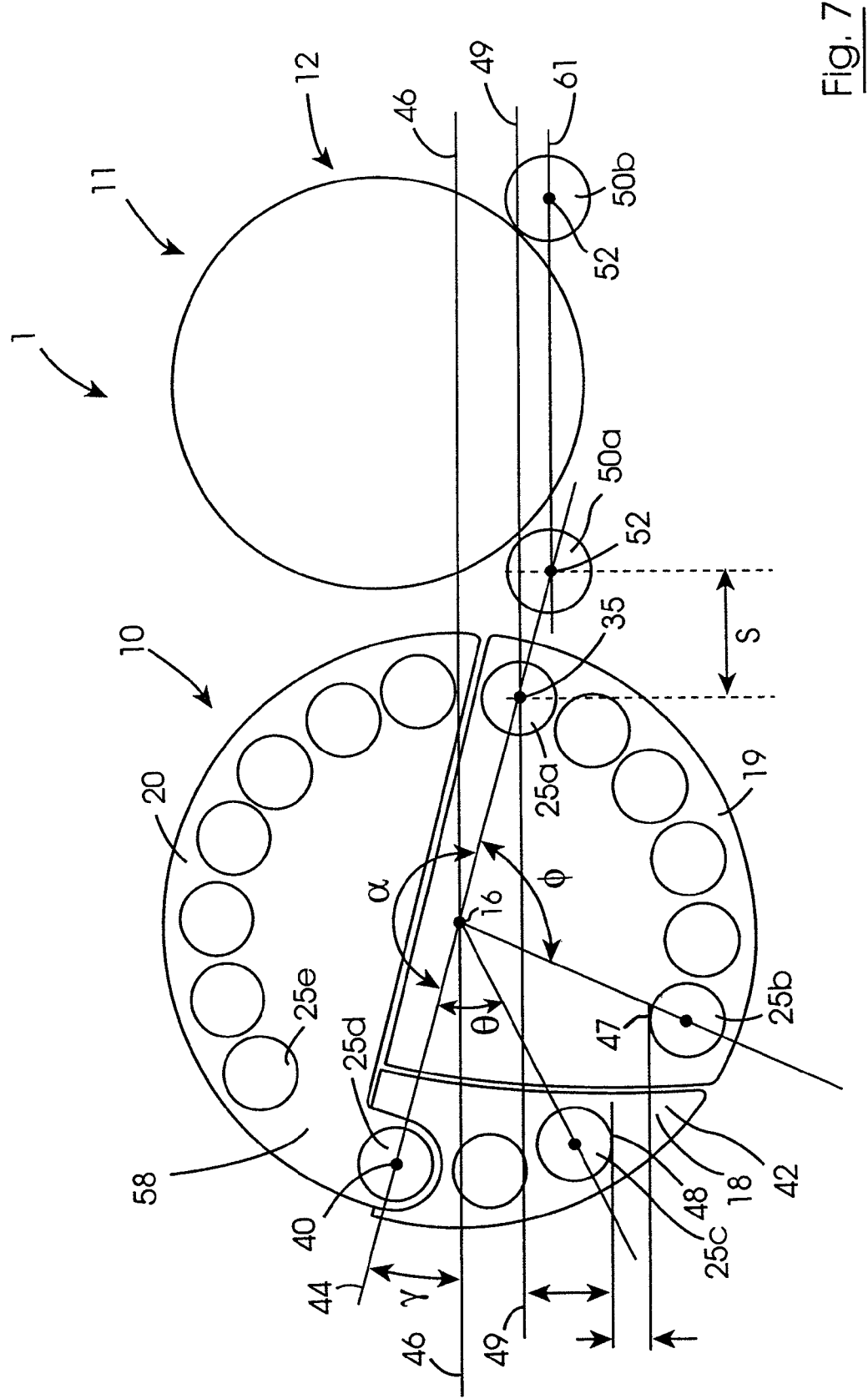
FIG. 7 is a partly diagrammatic side elevational view of the baler/bale wrapper of FIG. 1, FIGS. 8a to 8d are diagrammatic side elevational views of the baler/bale wrapper of FIG. 1, in use.

The bale forming rollers 25 of the upper segment 20 extend through an angle α of approximately 180° around the circumferential periphery of the bale forming chamber 15, while the bale forming rollers 25 of the stationary segment 18 extend through an angle θ of approximately 25° around the circumferential periphery of the bale forming chamber 15, see FIG. 7. The bale forming rollers 25 of the lower arcuate segment 19 extend through an angle φ of approximately 30° around the circumferential periphery of the bale forming chamber 15, see FIG. 7. When the lower segment 19 is in the bale forming position one of the bale forming rollers 25b of the lower segment 19 defines with one of the bale forming rollers 25c of the stationary segment 18 an inlet opening 42 to the bale forming chamber 15 through which the fodder material to be baled is fed into the bale forming chamber 15 as will be described below, see in particular FIGS. 6 and 7. The side walls 28 of the stationary segment 18, the lower side walls 30 of the lower segment 19 and the upper side walls 38 of the upper segment 20 form opposite end walls of the bale forming chamber 15 when the lower and upper segments 19 and 20 are in the bale forming position, for retaining the bale in the bale forming chamber 15 during formation thereof.

The first and second pivot shafts 32 and 39 are located adjacent the circumferential periphery of the bale forming chamber, with their respective pivot axes 35 and 40 spaced apart from each other approximately 180° around the main central axis 16. The respective first and second pivot axes 35 and 40 of the first and second pivot shafts 32 and 39, respectively, lie in a common plane 44 with the main central axis 16 which is disposed at an angle γ of approximately 15° to a horizontal plane 46 containing the main central axis 16, see FIG. 7. Accordingly, the first pivot axis 35 is disposed below the horizontal plane 46 about the main central axis 16 an angular distance of approximately 15°, and the second pivot axis 40 is disposed above the horizontal plane 46 about the main central axis 16 an angular distance of approximately 15°, see FIG. 7. In other words, the first and second pivot shafts 32 and 39 are located at substantially diametrically opposite sides of the bale forming chamber 15. Accordingly, by virtue of the fact that the second pivot axis 40 is disposed an angular distance of only 15° above the horizontal plane 46 containing the main central axis 16, the upper segment 18 when pivoting between the bale forming position and the discharge position pivots in a generally upwardly forwardly direction, thus causing minimum interference with the bale wrapper 11 when pivoting between the bale forming and discharge positions. Additionally, by virtue of the fact that the first pivot axis 35 is disposed an angular distance of approximately 15° below the horizontal plane 46 containing the main central axis 16, the lower segment 19 is pivoted in a generally upwardly direction from the bale forming position to the discharge position for thus urging the bale through a generally upwardly rearwardly directed arc from the bale forming chamber 15.

A first urging means provided by a pair of first hydraulic rams 41 on opposite sides of the chassis 5, see FIG. 8, act between the chassis 5 and the lower segment 19 for pivoting the lower segment 19 in the directions of the arrows A and C between the bale forming position and the discharge position. A second urging means provided by a pair of second hydraulic rams 43 on respective opposite sides of the baler 10, acting between the lower segment 19 and the upper segment 20, pivot the upper segment 20 about the second pivot shaft 39 in the direction of the arrows B and D between the bale forming and discharge positions, see FIG. 8. The first and second rams 41 and 43 are powered through hydraulic circuitry and hydraulic control circuitry (not shown) by the hydraulics power supply of the tractor or by an on-board hydraulic power supply. Such hydraulic circuitry will be well known to those skilled in the art.

A pick-up rake mechanism 45 (see FIG. 6) is provided forwardly of the inlet opening 42 beneath the chassis 5 for picking up fodder from the ground, and delivering the fodder through the inlet opening 42 into the bale forming chamber 15, such pick-up mechanisms will be well known to those skilled in the art. The bale forming rollers 25b and 25c which define the inlet opening 42 define respective lower and upper edges 47 and 48, respectively, of the inlet opening 42. Both the lower and upper edges 47 and 48 of the inlet opening 42 are located at respective levels which are below the level of a horizontal plane 49 which contains the first pivot axis 35, see FIG. 7. Accordingly, in this embodiment of the invention the entire inlet opening 42 is at a level below the first pivot axis, and thus is below the level at which the bale is discharged from the bale forming chamber 15 which is at a level above the first pivot shaft 32. This, thus, facilitates the baler 10 being located on the chassis 5 at a level suitable for picking up fodder from the ground, while at the same time discharging the bale 2 from the bale forming chamber 15 at a level which permits direct transfer by the lower segment 19 from the bale forming chamber 15 onto the bale wrapper 11 at a level which is suitable for wrapping the bale 2, without the need for further elevating mechanisms for elevating the bale onto the bale wrapper 11.

A gap 58, see FIGS. 6 and 7, is provided between one of the bale forming rollers 25d of the stationary segment 18, and one of the bale forming rollers 25e in the upper segment 20 for accommodating netting (not shown) from a roll (also not shown) mounted on the upper segment 20 for wrapping around the circumference of a formed bale in the bale forming chamber 15 prior to the formed bale being transferred from the baler 10 for retaining the material of the formed bale together prior to it being wrapped with film material by the bale wrapper 11. The provision and use of such netting material in the formation of a round bale will be well known to those skilled in the art. Instead of netting, twine or plastics material film may be fed through the gap 58 between the bale forming rollers 25d and 25e for tying or wrapping around the circumference of the formed bale in the bale forming chamber 15, for retaining the material of the bale together until it has been wrapped by the bale wrapper 11.

The bale wrapper 11 is a two axes bale wrapper, and comprises a bale support means in this embodiment of the invention provided by a pair of spaced apart first and second bale supporting rollers 50a and 50b, respectively, which support and rotate the bale 2 during wrapping. The first and second bale supporting rollers 50 are rotatably carried on a support framework 51, which is pivotally carried on the chassis 5, as will be described below. The bale supporting rollers 50 define central geometrical axes 52, which extend horizontally and parallel to each other and parallel to the main central axis 16 of the bale forming chamber 15. The bale supporting rollers 50 receive a formed bale directly from the baler 10 with the central axis of the bale parallel to the axes 52 of the bale supporting rollers 50. A first drive means provided by a first drive motor (not shown) is provided for driving one or both of the bale supporting rollers 50 about their respective geometrical axes 52 for rotating the bale 2 about a horizontal first wrapping axis 53 which coincides with the central geometric axis of the bale during wrapping of the bale 2. The first wrapping axis 53 extends parallel to the main central axis 16 defined by the bale forming chamber 15 and transversely of the main central longitudinal axis 8 defined by the chassis 5.

A wrapping material dispensing means for dispensing sheet wrapping material for wrapping the bale 2 on the bale supporting rollers 50 comprises a pair of wrapping material dispensers 54 which are carried on a carrier means, namely, a carrier ring 55. The carrier ring 55 is rotatably carried on a pair of upstanding supports 57 extending upwardly from the chassis 5, and extends completely around a bale 2 supported on the bale supporting rollers 50. The carrier ring 55 defines a central axis which in turn defines a second wrapping axis 56 about which the carrier ring 55 is rotatable for revolving the respective wrapping material dispensers 54 along a circular locus of travel defined by the carrier ring 55, so that the wrapping material dispensers 54 revolve around the bale 2 and about the second wrapping axis 56 simultaneously while the bale 2 is being rotated about the first wrapping axis 53 by the support rollers 50. The second wrapping axis 56 extends horizontally and parallel to the main central longitudinal axis 8 of the chassis 5, and thus perpendicularly to the first wrapping axis 53 about which the bale 2 is rotated on the bale supporting rollers 50.

Bearings (not shown) which are carried on the upstanding supports 57 rollably carry the carrier ring 55. Carrier rollers (not shown) mounted on side members 60 of the chassis 5 rollably engage the carrier ring 55. A second drive means, namely, a second drive motor (not shown) drives the carrier rollers (not shown) for in turn rotating the carrier ring 55 and in turn the wrapping material dispensers 54 about the second wrapping axis 56.

The first and second drive motors (not shown) are hydraulically powered motors, and are synchronised so that the respective rotational speeds of the bale supporting rollers 50 and the carrier ring 55 are synchronised for wrapping the bale.

The wrapping material dispensers 54 are conventional sheet wrapping material dispensers which support respective rolls 62 of plastics film sheet material, and are provided with tensioning rollers 63 for tensioning the film material as it is being drawn from the corresponding roll 62 for wrapping the bale.

The axes 52 of first and second bale supporting rollers 50 are contained in a horizontal plane 61 which is at a level slightly below the horizontal plane 49 containing the first pivot axis 35 for facilitating transfer of the bale 2 from the lower segment 19 of the baler onto the bale supporting rollers 50, see FIG. 7. It is envisaged that the horizontal plane 61 containing the axes 52 of the bale supporting rollers 50 may coincide with the horizontal plane 49 containing the first pivot axis 35, or indeed, in certain cases may be slightly above the horizontal plane 49 containing the first pivot axis 35. Although in this embodiment of the invention it is preferable that the horizontal plane 61 containing the central axes 52 of the bale supporting rollers 50 should be below or just below the horizontal plane 49 containing the first pivot axis 35.

Additionally, the baler 10 and the bale wrapper 11 are located on the chassis 5 relatively closely to each other so that the first bale supporting roller 50a is located relatively closely to the first pivot shaft 32, and in other words, to the bale forming roller 25a of the baler 10. However, a relatively short horizontal distance S (see FIG. 7) between the first pivot axis 35 and the central axis 52 of the first bale supporting roller 50a is required in order to accommodate some overhang of the bale 2 when supported on the bale supporting rollers 50 in order to avoid the bale supported on the bale supporting rollers 50 interfering with the baler 10. By keeping the horizontal distance S between the first pivot axis 35 and the central axis 52 of the first bale supporting roller 50a short, ease of transfer of the bale from the bale forming chamber 15 onto the bale supporting rollers 50 is facilitated, and additionally, the overall length of the baler/bale wrapper 1 is minimised.

Turning now to the support framework 51, the support framework 51 comprises a pair of L-shaped members 64 on respective opposite sides of the chassis 5, which are pivotally connected to the side member 60 of the chassis 5 by respective pivot shafts 65. The first bale supporting roller 50 is rotatably carried on the respective L-shaped members 64, while the second bale supporting roller 50 is rotatably carried on upstanding supports 66, which extend upwardly from the L-shaped members 64. Screws 67 rigidly secure the upstanding supports 66 to the L-shaped members 64. A ground engaging roller 68 is also rotatably carried between the L-shaped members 64.

A bale dispensing means provided by a pair of dispensing rams (not shown) mounted between the side members 60 of the chassis 5 and the corresponding L-shaped members 64 are provided for pivoting the support framework 51 around the pivot shafts 65 in the direction of the arrow E for dispensing a wrapped bale from the first and second bale supporting rollers 50 to the ground. The dispensing rams (not shown) pivot the support framework 51 in the direction of the arrow E until the ground engaging roller 68 engages the ground. On the wrapped bale having been dispensed from the first and second bale supporting rollers 50, the support framework 51 is returned by the dispensing rams to the position illustrated in FIG. 1 with the first and second bale supporting rollers 50 ready for receiving the next bale 2 from the bale forming chamber 15.

In use, the baler/bale wrapper 1 is hitched to a tractor, and the hydraulic and mechanical power supplies from the tractor are appropriately connected to the baler/bale wrapper for powering thereof. Rolls 62 of opaque plastics sheet film material are loaded in the wrapping material dispensers 54. The stationary, lower and upper arcuate segments 18, 19 and 20 are urged into the bale forming position illustrated in FIGS. 3, 4, 7 and 8a. As the baler/bale wrapper 1 is drawn forward by the tractor grass, hay, straw or other fibrous fodder material to be baled is picked up from the ground by the pick-up rake mechanism 45 and delivered into the bale forming chamber 15 through the inlet opening 42. As the fodder material is urged into the bale forming chamber 15, the rotating bale forming rollers 25 rotate the fodder material about the main central axis 16 for in turn forming a bale 2. On the bale being formed, netting from the roll of netting (not shown) mounted on the upper segment 20 is drawn into the bale forming chamber and wrapped around the formed bale in the bale forming chamber 15 for retaining the baled material together in the bale. This operation will be well known to those skilled in the art.

Figure 8A:
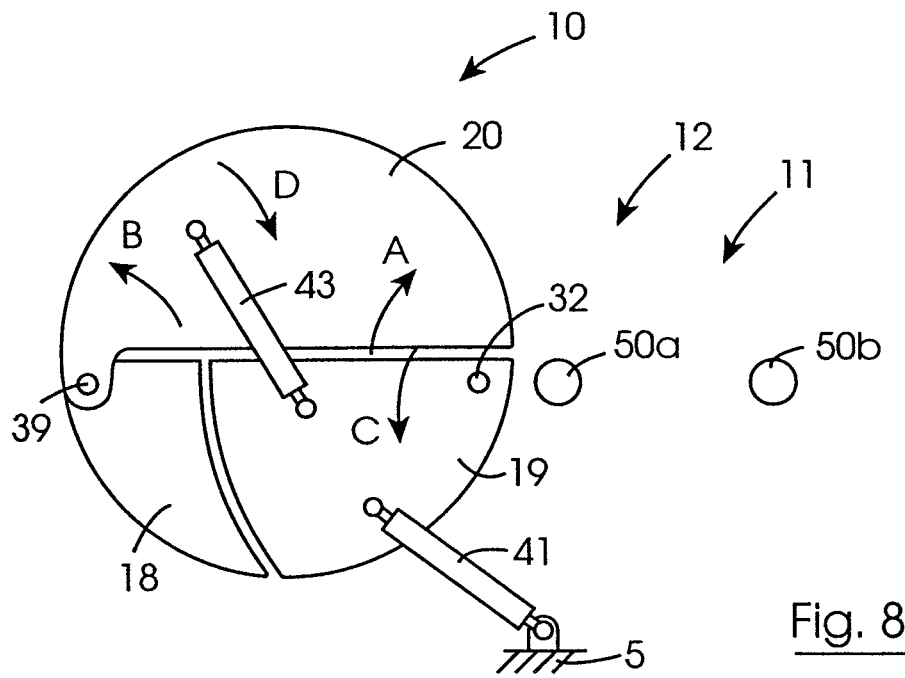
Figure 8D:
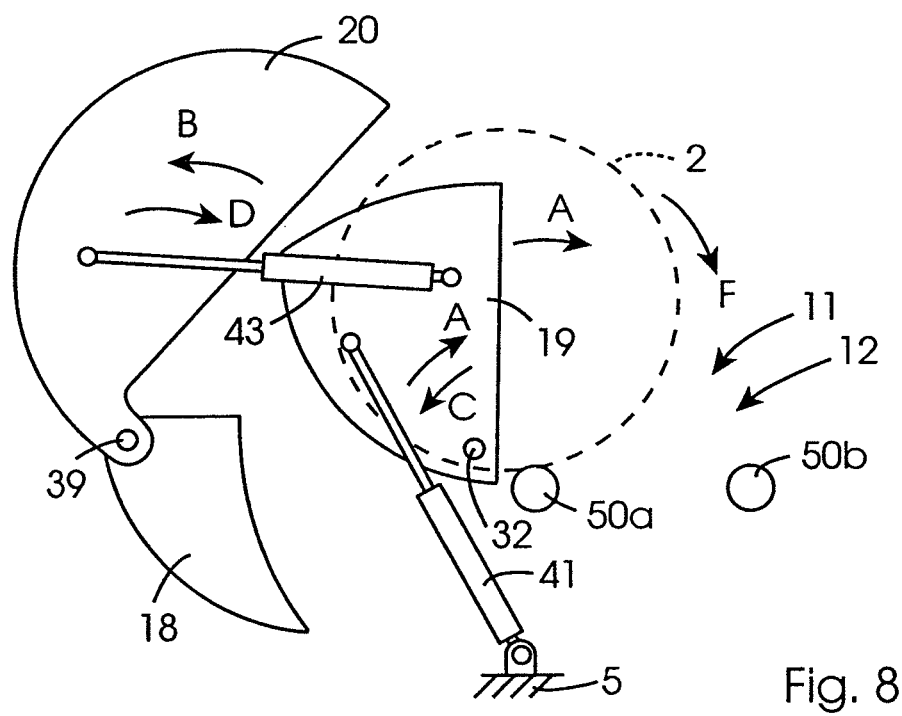
Figure 8B:
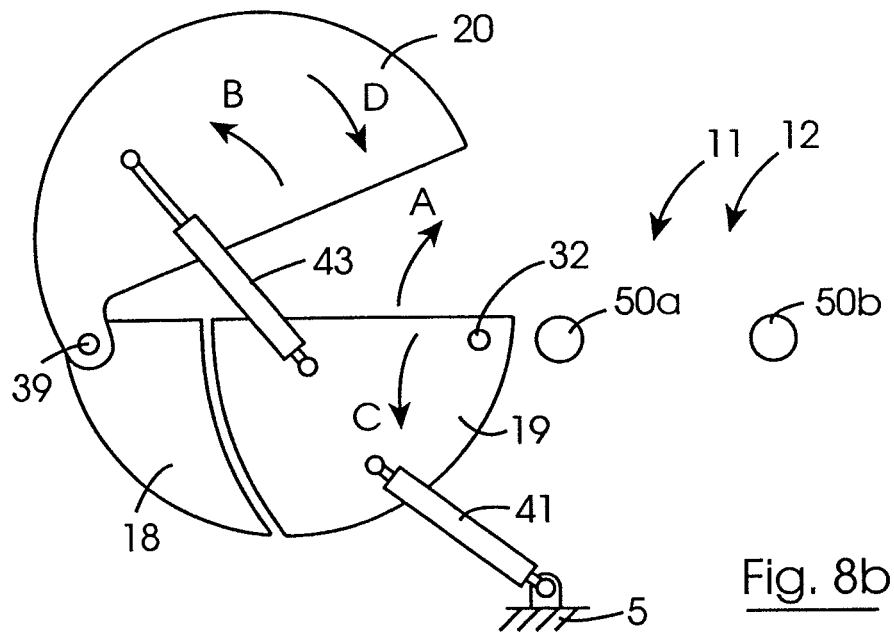
Figure 8C:
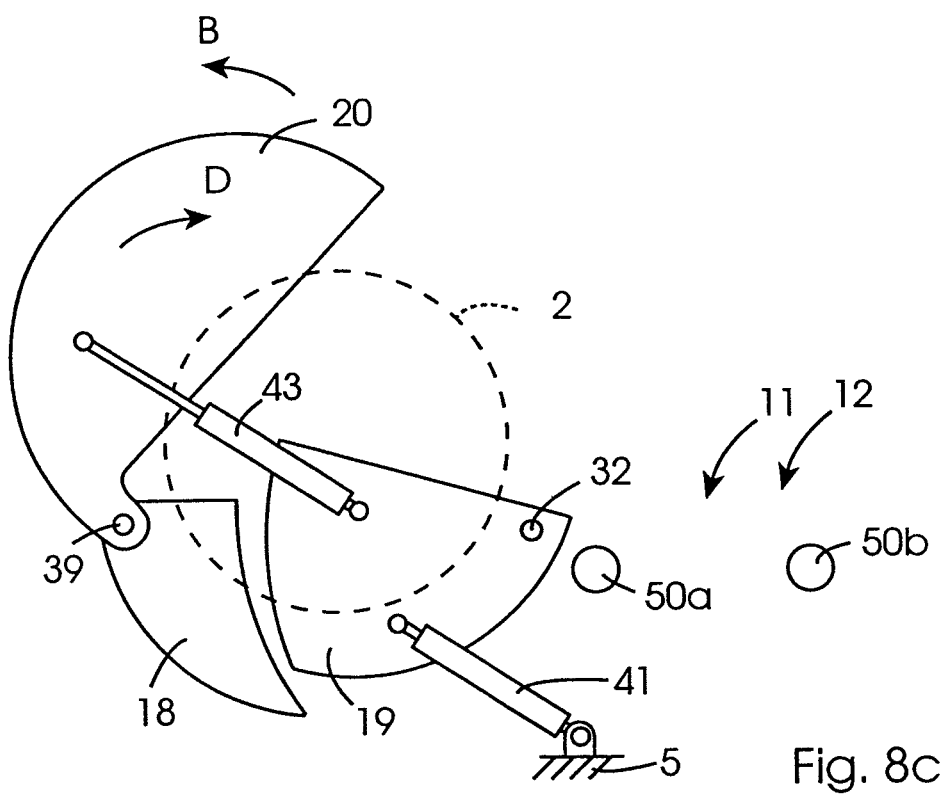

The upper arcuate segment 20 is then initially pivoted generally upwardly in the direction of the arrow B by the second rams 43, see FIG. 8b, for forming with the lower arcuate segment 19 the open mouth. After pivoting of the upper segment 20 from the bale forming position has commenced to a position substantially similar to that illustrated in FIG. 8b, the first rams 41 are activated for commencing pivoting of the lower segment 19 from the bale forming position in the direction of the arrow A, see FIG. 8c. The upper and lower segments 20 and 19, respectively, are simultaneously pivoted by the second and first rams 43 and 41, respectively in the directions of the arrows B and A, respectively until both the upper segment 20 and the lower segment 19 are in their respective discharge positions, see FIG. 8d.

As the lower segment 19 pivots from the bale forming position to the discharge position the lower segment 19 sweeps through the bale forming chamber 15 for urging the formed bale 2 in a generally upwardly rearwardly outwardly direction from the bale forming chamber 15, and effectively tips the bale 2 from the bale forming chamber 15 onto the first bale supporting roller 50, see FIG. 8d. Once the lower segment 19 is in the discharge position the centre of gravity of the formed bale 2 is located relative to the first bale supporting roller 50a for pivoting the bale 2 about the first bale supporting roller 50a in the direction of the arrow F, for continuing the transfer of the formed bale 2 onto the respective first and second bale supporting rollers 50, see FIG. 8d.

On the bale 2 being tipped from the lower segment 19 onto the first and second bale supporting rollers 50 the first rams 41 are operated for pivoting the lower segment 19 in the direction of the arrow C for returning the lower segment 19 to the bale forming position. After initial pivoting of the lower segment 19 from the discharge position has commenced, the second rams 43 are operated for pivoting the upper segment 20 from the discharge position to the bale forming position. The first and second rams 41 and 43 are operated so that the lower segment 19 is returned to the bale forming position just before the upper segment 20 is returned to the bale forming position. The pivoting of the upper and lower segments 20 and 19 by the second and first rams 43 and 41 is synchronised so that as the lower segment 19 is pivoting in the direction of the arrow A with a formed bale thereon, the upper segment 20 has been pivoted through a sufficient angle to provide clearance for the bale as it is being transferred from the bale forming chamber 15.

Once the formed bale 2 has been tipped by the lower segment 19 onto the bale supporting rollers 50, the bale supporting rollers commence rotating the bale around the first wrapping axis, namely, the horizontal geometric axis of the bale 2. Simultaneously, rotation of the carrier ring 55 about the second wrapping axis 56 is commenced, and film material from the wrapping material dispenser 54 is attached to the bale 2 being rotated on the first and second bale supporting rollers 50. Mechanisms for attaching the film material from the wrapping material dispensers 54 to the bale 2 as the dispensers 54 are revolved around the second wrapping axis 56 will be well known to those skilled in the art. As the carrier ring 55 rotates about the second wrapping axis 56 film material from the wrapping material dispensers 54 is wrapped onto the bale 2. Simultaneous rotation of the bale 2 about the first wrapping axis 53 and revolving of the wrapping material dispensers 54 about the second wrapping axis 56 cause the film wrapping material to be drawn from the dispensers 54 and wrapped in overlapping layers onto the bale 2.

On the bale 2 being wrapped, a cutting mechanism (not shown) associated with each of the wrapping material dispensers 54 cuts the film material, thus isolating the wrapped bale from the wrapping material dispensers 54. Such cutting mechanisms will be well known to those skilled in the art. The dispensing rams (not shown) are then operated for pivoting the carrier framework 51 about the pivot shafts 65 in the direction of the arrow E for dispensing the wrapped bale from the first and second bale supporting rollers 50 onto the ground. The dispensing rams are then operated in reverse for returning the supporting framework 51 for receiving the next formed bale from the baler 10.

While each bale is being wrapped on the bale wrapper 11 the next bale is simultaneously being formed in the bale forming chamber 15, and once the next bale 2 has been formed, transfer of the formed bale from the bale forming chamber 15 onto the first and second bale supporting rollers 50 is again carried out as already described, and so operation of the combined baler/bale wrapper 1 continues.

Referring now to FIGS. 9 to 17 there is illustrated a baler/bale wrapper according to another embodiment of the invention which is indicated generally by the reference numeral 70. The baler/bale wrapper 70 is substantially similar to the baler/bale wrapper 1, and similar components are identified by the same reference numerals. However, in order to facilitate an understanding of the principle of the invention, only those components which are essential to the operating principle of the invention are clearly illustrated. The remaining components are assumed to be present.

In this embodiment of the invention the baler 10 is substantially similar to the baler 10 of the baler/bale wrapper 1, although in this case the lower segment 19 comprises only five bale forming rollers 25, and the bale forming rollers 25 extend through the angle φ in this embodiment of the invention of approximately 75° around the circumferential periphery of the bale forming chamber 15. A pair of mounting brackets 73 extending upwardly from the chassis 5 on respective opposite sides of the baler 10 pivotally and rotatably carry the first pivot shaft 32 about which the lower segment 19 is pivotal from the bale forming position to the discharge position for tipping a formed bale onto the bale wrapper 11.

First and second urging means provided by respective pairs of first and second rams 71 and 72 for urging the respective lower segment 19 and upper segment 20 between the bale forming position and their respective discharge positions are provided. The first rams 71 are located on respective opposite sides of the baler 10 and extend between respective pivot anchorages 74 on respective opposite sides of the chassis 5 and respective pivot anchorages 75 on the respective lower side walls 30 of the lower segment 19. The second rams 72 are located on respective opposite sides of the baler 10, and are connected between respective pivot anchorages 76 on the lower side walls 30 of the lower segment 19 and respective pivot anchorages 77 on the upper side walls 38 of the upper segment 20.

An hydraulic control circuit (not shown) which comprises a plurality of hydraulic valves (also not shown) controls the operation of the respective first and second rams 71 and 72 so that when the lower and upper segments 19 and 20 are in the bale forming position and a bale has been formed in the bale forming chamber 15, the second rams 72 are initially operated for pivoting the upper segment 20 about the second pivot axis 40 upwardly relative to the baler 10 for defining with the lower segment 19 the open mouth for facilitating transfer of a formed bale from the baler 10. After the second rams have pivoted the upper segment 20 through a sufficient angle to provide clearance for the bale being transferred from the bale forming chamber 15, the first rams 71 are operated for pivoting the lower segment 19 about the first pivot axis 35 upwardly for tipping the formed bale from the lower segment 19 onto to the bale wrapper 11.

Figure 10:
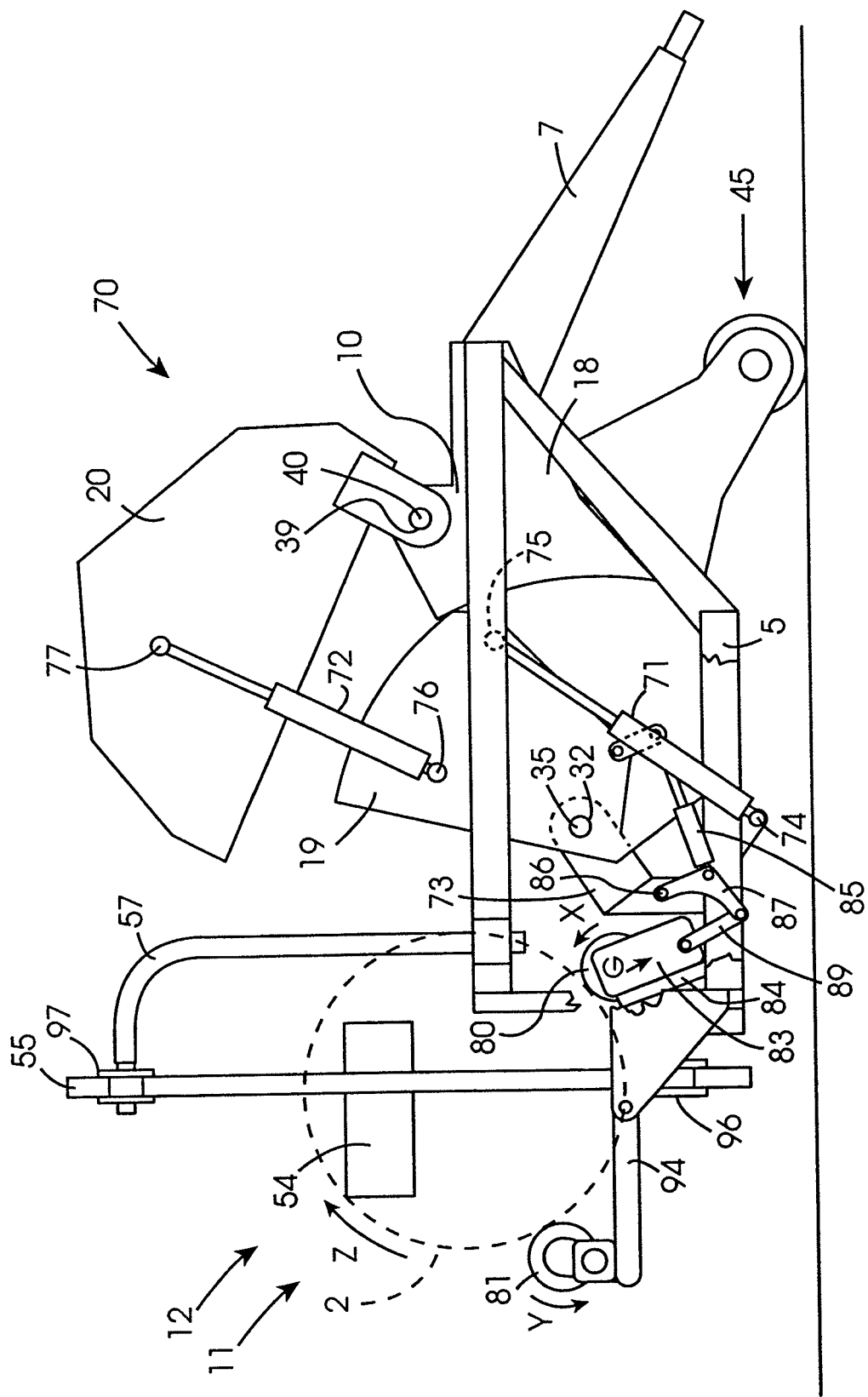
FIG. 10 is a view similar to FIG. 9 of the baler/bale wrapper of FIG. 9 illustrating portions of the baler/bale wrapper in a different position.
Figure 11:
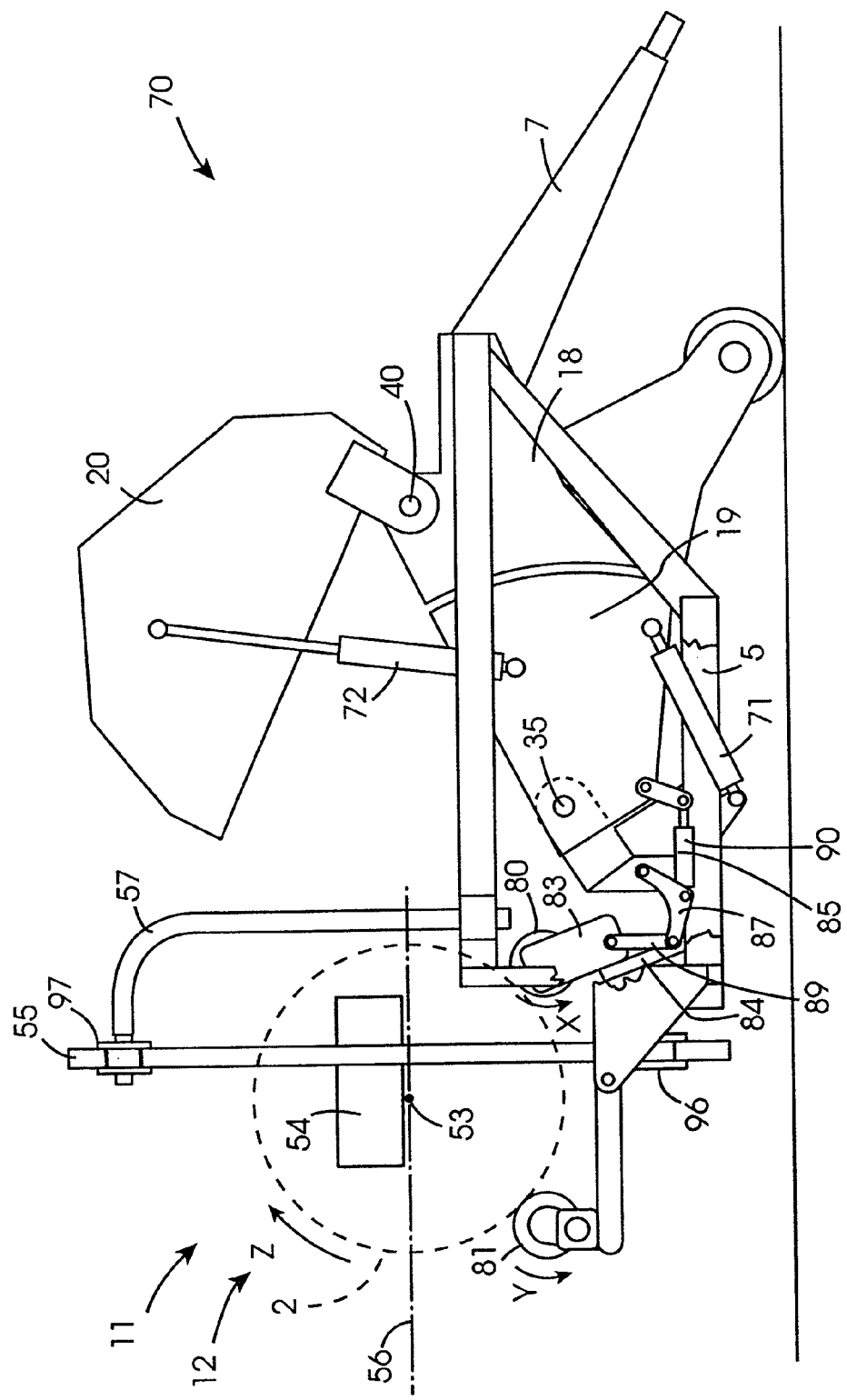
FIG. 11 is a view similar to FIG. 9 of the baler/bale wrapper of FIG. 9 illustrating a portion of the baler/bale wrapper in a different position.
Figure 12:
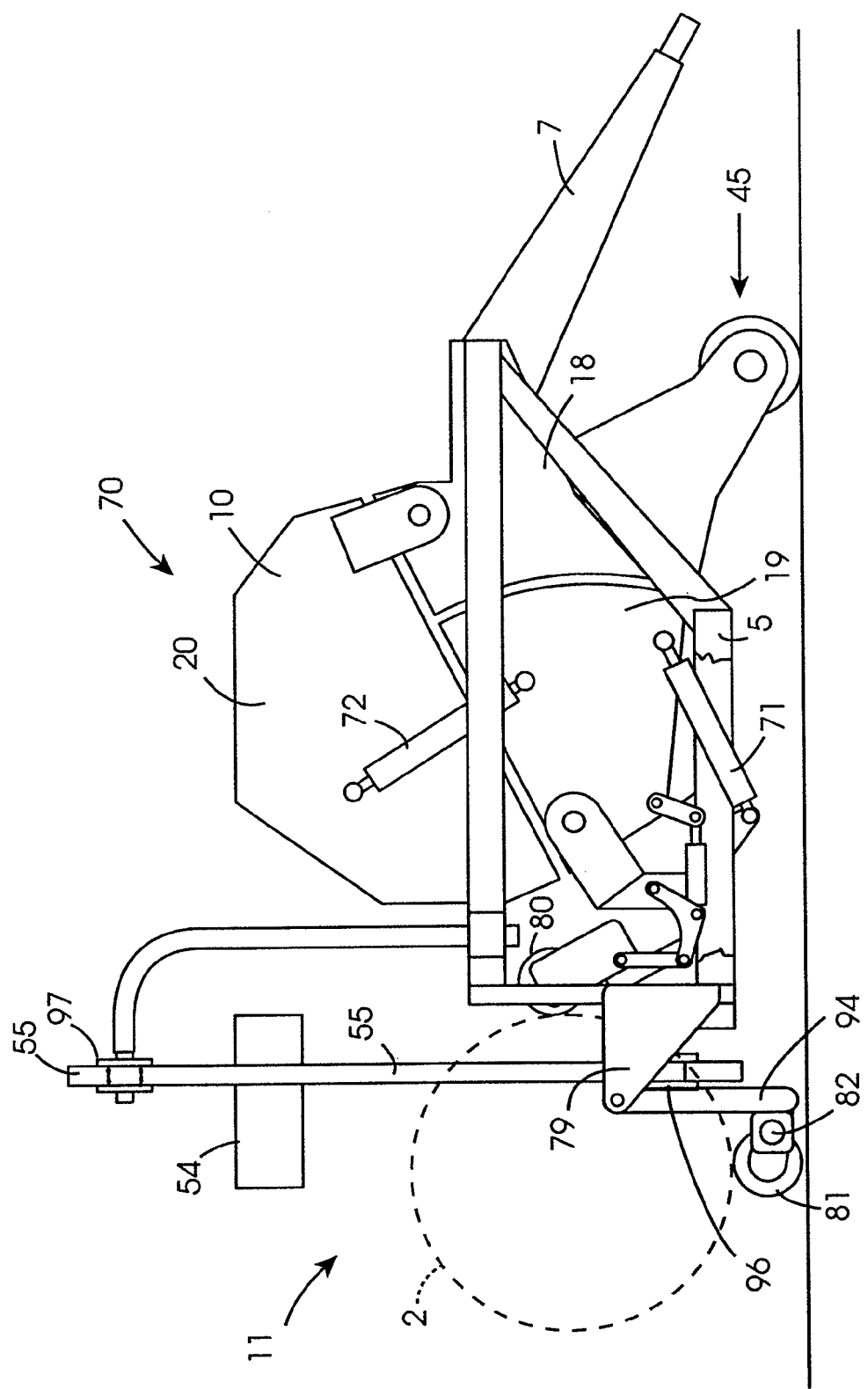
FIG. 12 is a view similar to FIG. 9 of the baler/bale wrapper of FIG. 9 illustrating another portion of the baler/bale wrapper in a different position.
Figure 15:
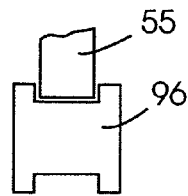
FIG. 15 is a plan view of another detail of the baler/bale wrapper of FIG. 9.
Figure 13:
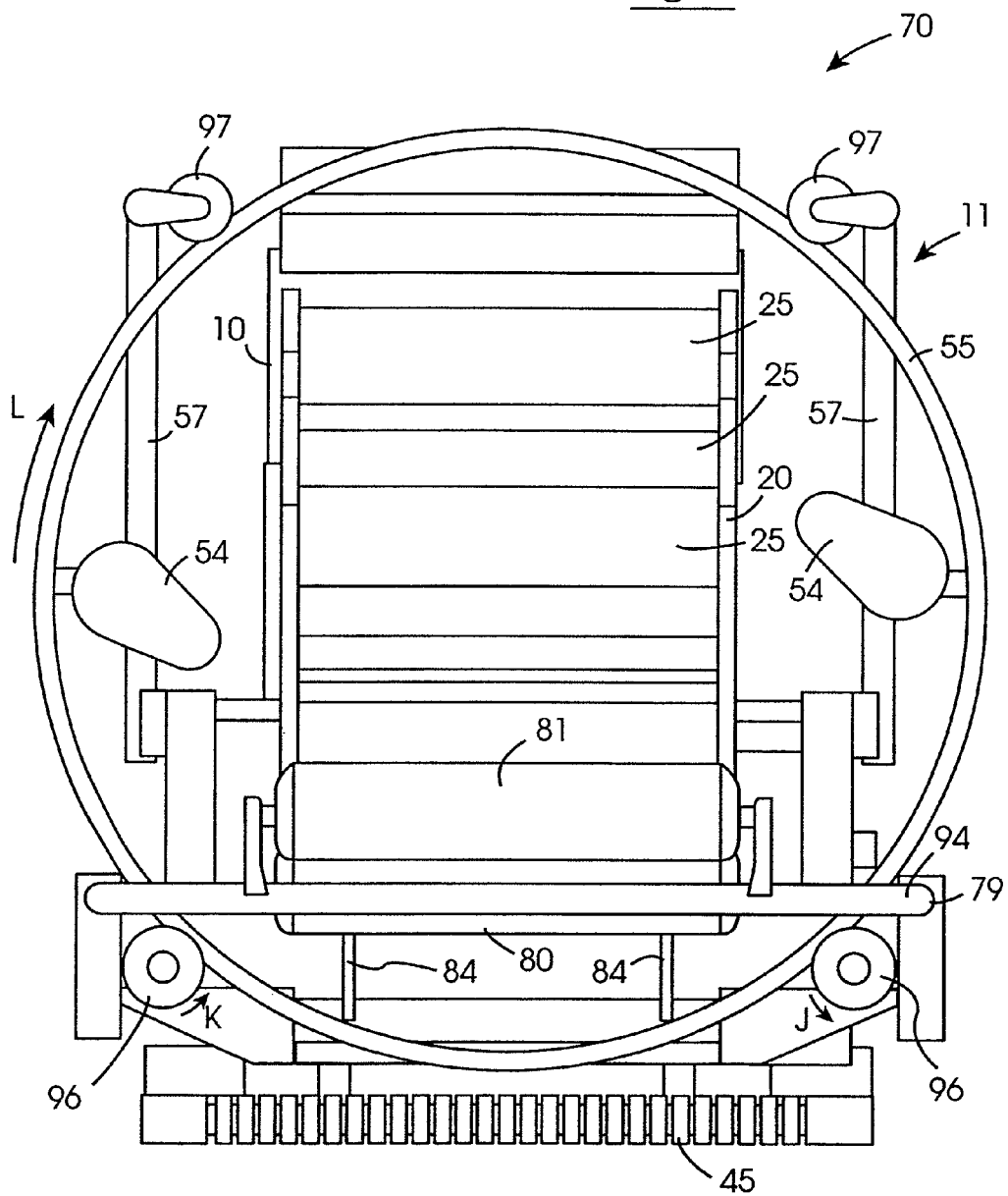
FIG. 13 is a rear end view of the baler/bale wrapper of FIG. 9.
Figure 17A:
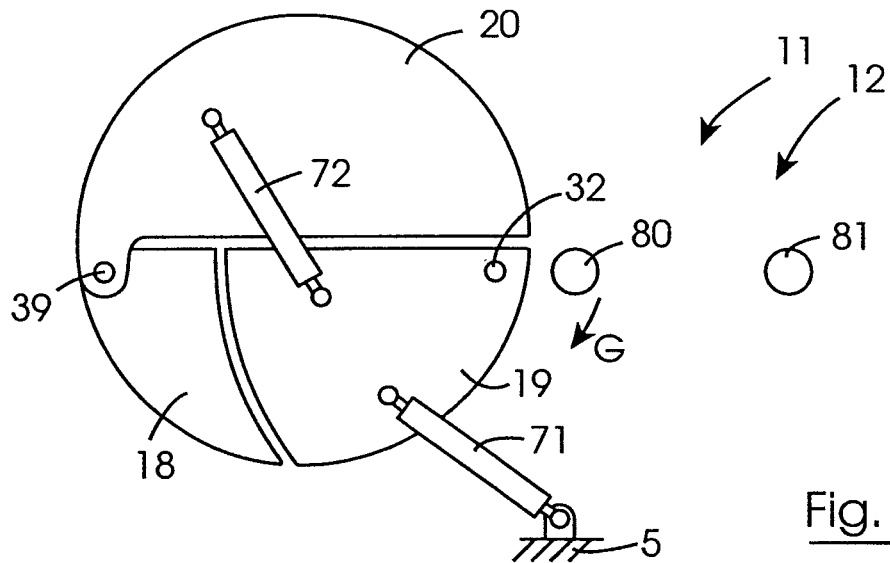
Figure 17D:
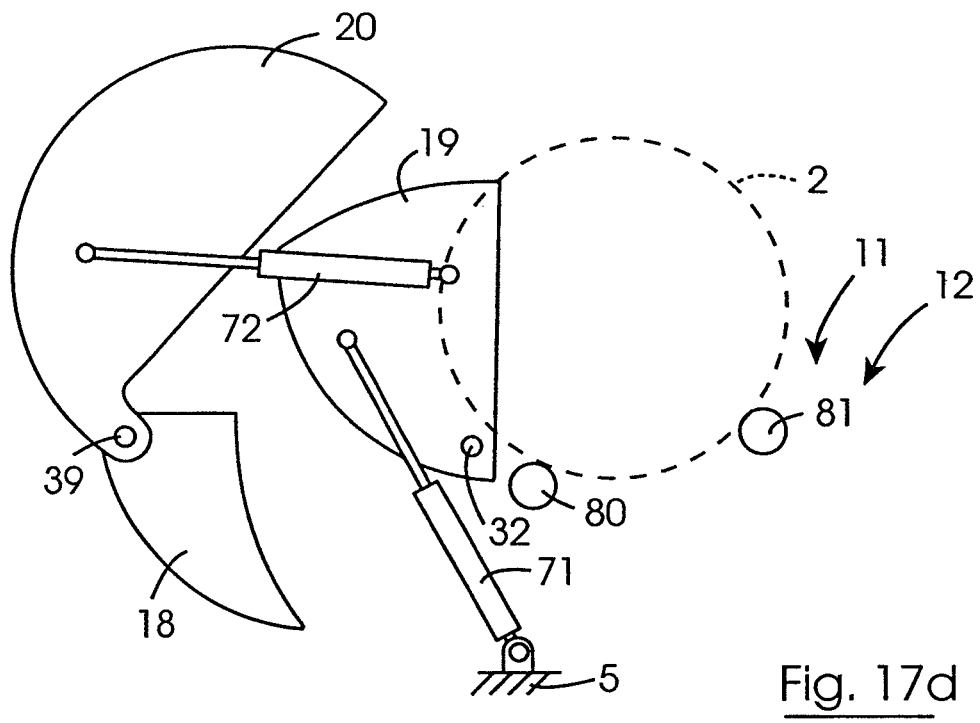
Figure 17B:
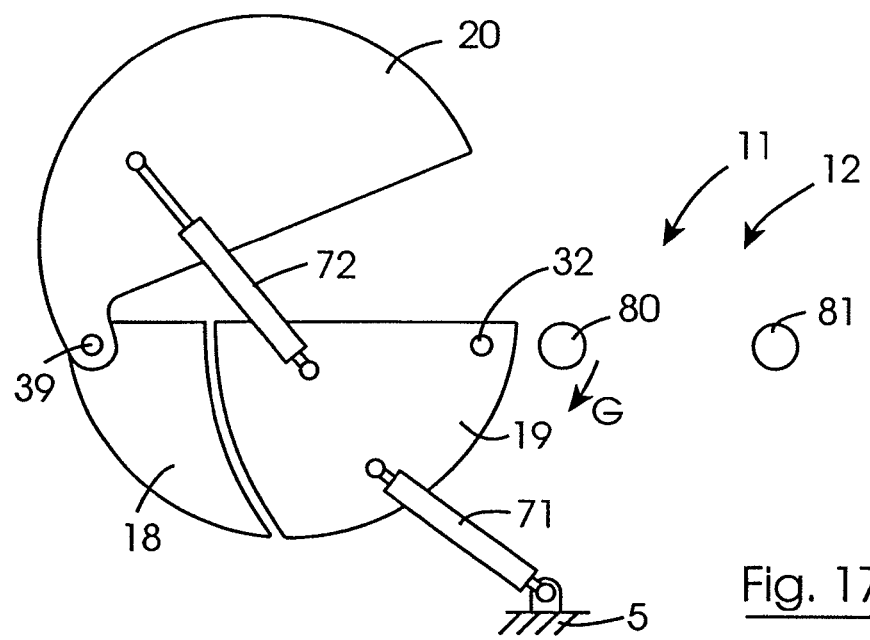

Turning now to the bale wrapper 11, the bale wrapper 11 comprises a support framework 79 extending rearwardly from the chassis 5. First and second bale supporting rollers 80 and 81, respectively, are supported on the support framework 79 for receiving a formed bale for wrapping from the baler 10. The first and second bale supporting rollers 80 and 81, respectively, are spaced apart from each other on the support framework 79 and extend parallel to each other and parallel to the main central axis 16 as in the case of the bale wrapper 11 of the baler/bale wrapper 1. However, in this embodiment of the invention the first bale supporting roller 80 is carried on a first roller carrier means, namely, a first carrier framework 83 which is slideably mounted on respective inclined guide tracks 84 located on the support framework 79 on respective opposite sides of the chassis 5. The first carrier framework 83 is slideable upwardly and downwardly for urging the first bale supporting roller 80 between an upper bale wrapping position as illustrated in FIGS. 9 and 17a and a lower bale receiving position as illustrated in FIGS. 10 and 17d for facilitating transfer of a formed bale from the lower segment 19 of the baler 10 onto the bale wrapper 11.

A connecting means comprising a pair of connecting linkage 85 on respective opposite sides of the baler 10 connects the first carrier framework 83 to the lower segment 19, so that as the lower segment 19 pivots from the bale forming position to the discharge position, the first carrier framework 83 is urged downwardly from the bale wrapping position into the lower bale receiving position for facilitating the transfer of a formed bale from the lower segment 19 onto the bale wrapper 11.

Each connecting linkage 85 comprises a pivot member 87 which is pivotally carried in the chassis 5 on a pivot shaft 86. A connecting rod 89 extending from the corresponding pivot member 87 connects the corresponding pivot member 87 to the first carrier framework 83 at corresponding side thereof. The connecting rods 89 are pivotally connected to the first carrier framework 83 and to the corresponding pivot members 87. A telescoping connecting rod 90 connects the corresponding pivot members 87 to corresponding lower side wall 30 of the lower segment 19 for facilitating limited free movement between the lower segment 19 and the pivot members 87, and in turn the first carrier framework 83. The telescoping connecting rods 90 are connected to the corresponding pivot members 87 by pivotal connections 91 and to the respective lower side walls 30 of the lower segment 19 by pivot anchorages 92. During pivotal travel of the lower segment 19 from the bale forming position to the discharge position the travel of the pivotal anchorage 92 is greater than the required travel of the first carrier framework 83 between the bale wrapping position and the lower bale receiving position, and thus the greater travel of the pivot anchorages 92 relative to the pivot connections 91 is accommodated by the telescoping connecting rods 90.

Additionally, the support framework 79 comprises a second roller carrier means, namely, a second carrier framework 94 which carries the second bale supporting roller 81. The second carrier framework 94 is pivotally connected to the support framework 79 by pivot pins 95, and is pivotal between a first position with the second bale supporting roller 81 in the bale wrapping position, see FIG. 9, and a second position with the second bale supporting roller 81 in a lower bale dispensing position, see FIG. 12, for facilitating dispensing of a wrapped bale from the bale wrapper 11 onto the ground. A pair of dispensing hydraulic rams (not shown) connected between the support framework 79 and the second carrier framework 94 pivot the second carrier framework 94 between the first and second positions, and in turn the second bale supporting roller 81 between the bale wrapping position and the lower bale dispensing position, respectively.

An hydraulic motor (not shown) is located on the first carrier framework 83 for rotating the first bale supporting roller 80. An hydraulic motor 82 is mounted on the second carrier framework 94 for rotating the second bale supporting roller 81. The first and second bale supporting rollers 80 and 81 are rotated in the directions of the arrows X and Y for rotating the formed bale 2 about the first wrapping axis 53 in the direction of the arrow Z.

In this embodiment of the invention the wrapping material dispensers 54 are illustrated in block representation mounted on the carrier ring 55. The carrier ring 55 is carried on a pair of carrier rollers 96, which are in turn rotatably carried on the support framework 79. Hydraulic motors (not shown) mounted on the support framework 79 drive the carrier rollers 76 in the directions of the arrows J and K, for in turn rotating the carrier ring 55 about the second wrapping axis 56 in the direction of the arrow L, see FIG. 13. A pair of idler guide rollers 97 carried on the upstanding supports 57 retain the carrier ring 55 in a vertical plane. The carrier rollers 96 and the guide rollers 97 are flanged rollers, see FIG. 15 for engaging and retaining the carrier ring 55 in a vertical plane.

Figure 16:
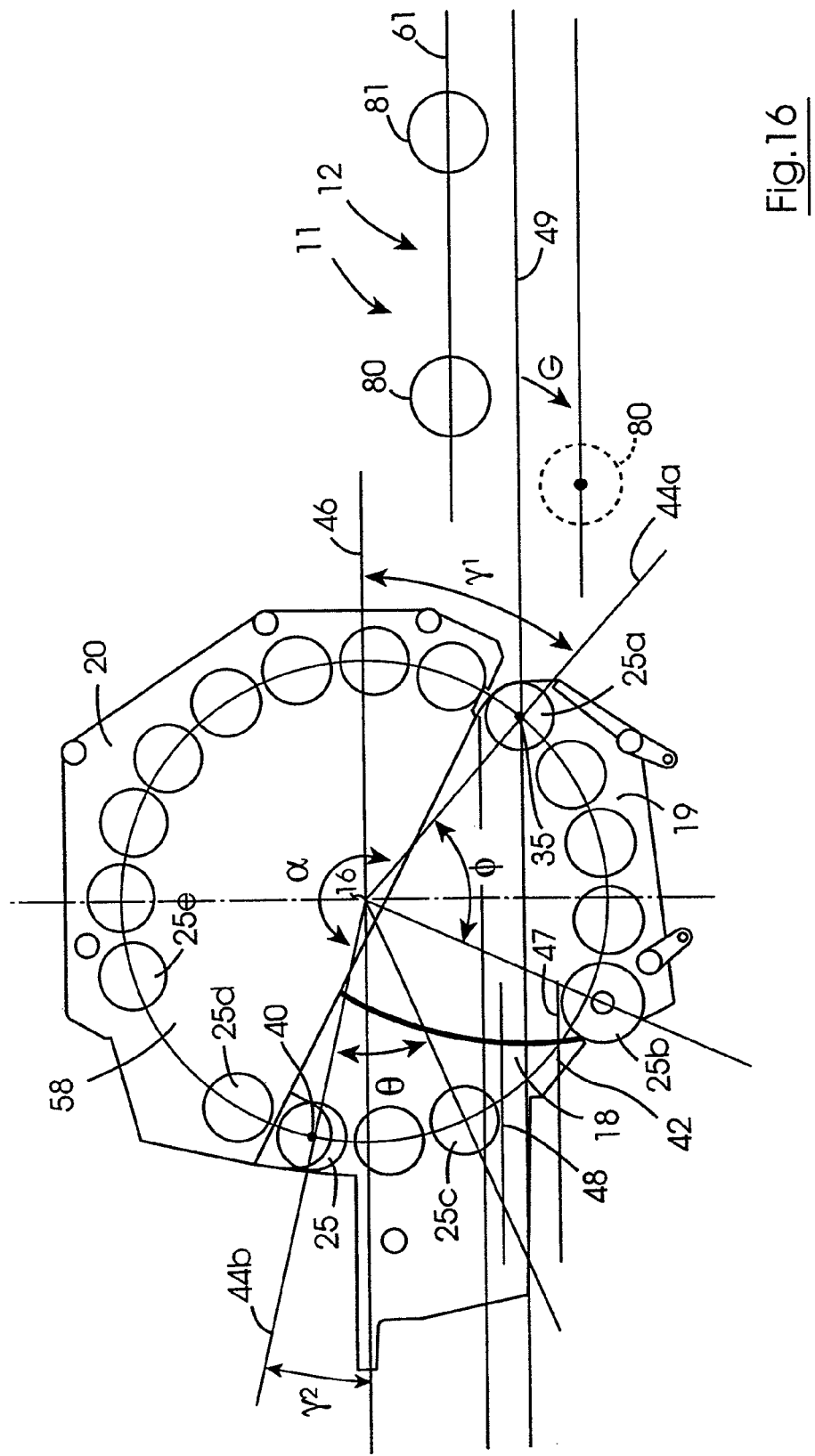
FIG. 16 is a partly diagrammatic side elevational view of the baler/bale wrapper of FIG. 9, FIGS. 17a to 17d are diagrammatic side elevational views of the baler/bale wrapper of FIG. 9, in use.

In this embodiment of the invention the first and second pivot axes 35 and 40 are not contained in a common plane with the central pivot axis 16 of the bale forming chamber 15, see FIG. 16. Rather, the first pivot axis 35 is contained in a plane 44a with the main central axis 16 while the second pivot axis 40 is contained in a plane 44b with the main central axis 16. The plane 44a which contains the first pivot axis 35 and the main central axis 16 makes an angle $\gamma^1$ with the horizontal axis 46 through the main central axis 16 of approximately 40°. The plane 44b which contains the second pivot axis 40 and the main central axis 16 makes an angle $\gamma^2$ of approximately 13° with the horizontal axis 46. Accordingly, the first and second pivot axes 35 and 40 are spaced apart an angle α about the main central axis 16 of approximately 207° on the upward side of the bale forming chamber 15. The bale forming rollers 25 of the stationary segment 18 extend around the circumferential periphery of the bale forming chamber an angular distance θ of approximately 30°.

Accordingly, in this embodiment of the invention the first pivot axis is located in the circumferential periphery of the bale forming chamber an angular distance below the horizontal axis 46 an angular distance $\gamma^1$ of approximately 40°. The second pivot axis 40 is located in the circumferential periphery of the bale forming chamber 15 above the horizontal plane 46 an angular distance $\gamma^2$ of approximately 13°. In this embodiment of the invention the first pivot axis 35 is located above the lower edge 47 of the inlet opening 42 but below the upper edge 48 of the inlet opening 42. In fact, the first pivot axis 35 is located at a level below the horizontal axis 46 which substantially coincides with a midway position between the lower edge 47 and the upper edge 48 of the inlet opening 42. However, as can be seen from FIG. 16 the bale forming roller 25a which is rotatable about the first pivot axis 35 is of diameter such that the upper level of the bale forming roller 25a is above the level of the inlet opening 42 to the bale forming chamber 15, and thus, the bale is discharged from the bale forming chamber at a level which is entirely above the inlet opening 42.

The central axes 52 of the first and second bale supporting rollers 80 and 81 when in the bale wrapping position are contained in the horizontal plane 61. However, in this embodiment of the invention the horizontal plane 61 when the first and second bale supporting rollers 80 and 81 are in the bale wrapping position is at a level above the horizontal plane 49 of the first pivot axis 35. However, when the first bale supporting roller 80 is in the bale receiving position, the first bale supporting roller 80 is at a level below the horizontal plane 49 of the first pivot axis 35 for thereby facilitating direct transfer of the bale from the bale forming chamber 15 onto the first and second bale supporting rollers 80 and 81.

Otherwise the baler/bale wrapper 70 is substantially similar to the baler/bale wrapper 1, and its operation is also substantially similar.

In use, material to be baled, for example, grass, hay, straw or the like is picked up by the pick-up mechanism 45 and fed into the bale forming chamber 15 where it is rotated about the main central axis 16 and formed into a bale. On the bale being formed netting from the roll of netting (not shown) mounted on the upper segment 20 is drawn into the bale forming chamber and wrapped around the formed bale in the bale forming chamber 15 for retaining the baled material together in the bale. The first and second hydraulic rams 71 and 72 are then operated in sequence for initially pivoting the upper segment 20 from the bale forming position towards the discharge position for defining the open mouth with the lower segment 19, see FIG. 17b. While the upper segment 20 is pivoting towards the discharge position, pivoting of the lower segment 19 upwardly from the bale forming position to the discharge position commences for tipping the bale upwardly rearwardly directly from the bale forming chamber 15 onto the bale wrapper 11, see FIG. 17c.

Figure 17C:
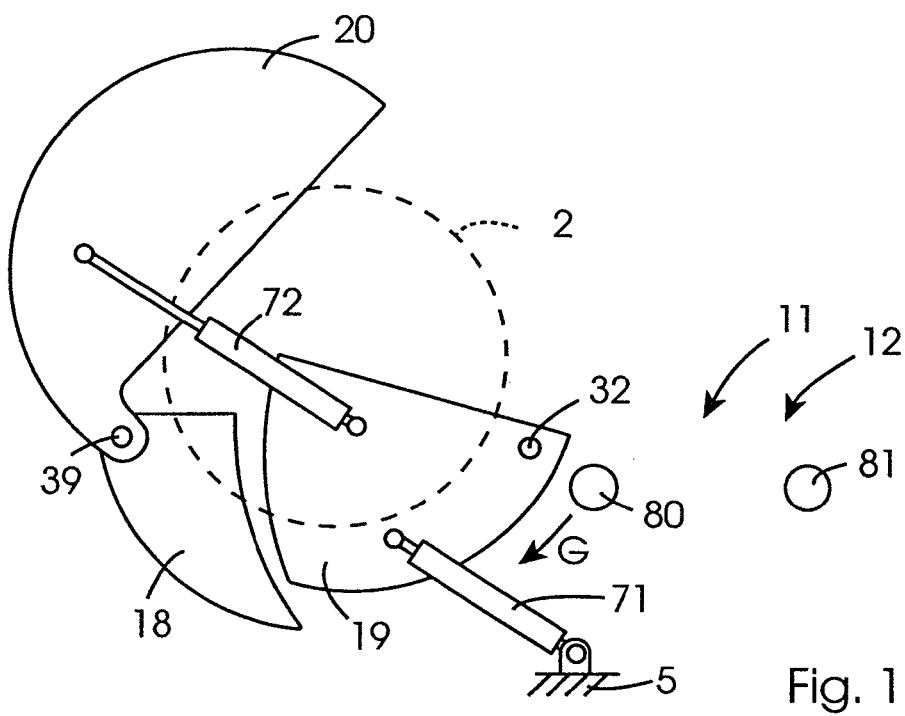

As the lower segment 19 is being pivoted upwardly by the second rams 72 the first bale supporting roller 80 is urged downwardly in the direction of the arrow G from the bale wrapping position to the bale receiving position for facilitating transfer of the bale from the lower segment 19 onto the bale wrapper 11, see FIGS. 17c and 17d. When the lower segment 19 has pivoted into the bale discharge position, the first bale supporting roller 80 is in the bale receiving position, see FIG. 16d, thereby facilitating ease of transfer of the bale from the lower segment 19 onto the first and second bale supporting rollers 80 and 81.

The first and second rams 71 and 72 are then operated in the reverse sequence for initially commencing return of the lower segment 19 to the bale forming position, and while the lower segment 19 is being returned to the bale forming position, return of the upper segment 20 to the bale forming position is commenced. The lower segment 19 and the upper segment 20 are returned to the bale forming position with the lower segment 19 reaching the bale forming position just before the upper segment 20 reaches the bale forming position. As the lower segment 19 is being returned to the bale forming position, the first bale supporting roller 80 is raised into the bale wrapping position, and the bale wrapper 11 is ready to wrap the bale.

The first and second bale supporting rollers 80 and 81 are rotated in the direction of the arrows X and Y for rotating the bale about the first wrapping axis 53. Simultaneously the carrier ring 55 is rotated about the second wrapping axis 56 in the direction of the arrow L by the carrier rollers 96 for in turn simultaneously revolving the wrapping material dispensers 54 around the bale 2. As the bale 2 is being rotated about the first wrapping axis 53 and the wrapping material dispensers 54 are being revolved about the second wrapping axis 56, film material is dispensed onto the formed bale 2 for wrapping thereof.

When the bale 2 has been wrapped the second carrier framework 94 is pivoted from the first position to the second position, for in turn pivoting the second bale supporting roller 81 to the lower bale dispensing position for dispensing the wrapped bale 2 from the bale wrapper 11 to the ground.

While the bale 2 on the bale wrapper 11 is being wrapped, the next bale is being formed simultaneously in the bale forming chamber 15, and so operation of the combined baler/bale wrapper 70 continues.

In both the baler/bale wrappers 1 and 70 according to the invention the main central longitudinal axis 8 defined by the baler/bale wrapper 1 extends substantially horizontally and longitudinally of the baler/bale wrapper 1. The main central axis 16 defined by the bale forming chamber 15 extends transversely of the main central longitudinal axis 8 and also horizontally. Accordingly, the first and second pivot axes 35 and 40, respectively, also extend transversely of the main central longitudinal axis 8 and also horizontally. The roller axes of the respective first and second bale supporting rollers 50 of the bale/bale wrapper 1, and the roller axes of the respective first and second bale supporting rollers 80 and 81 of the baler/bale wrapper 70 also extend transversely of the main central longitudinal axis 8 and horizontally. In fact, the roller axes of the first and second bale supporting rollers and the first and second pivot axes 35 and 40 all extend parallel to the main central longitudinal axis 16 defined by the bale forming chamber 15. The first wrapping axis 53 of the bale during wrapping in the bale wrapper 11 also extends horizontally and parallel to the main central longitudinal axis 16 defined by the bale forming chamber 15, while the second wrapping axis 56 about which the wrapping material dispensers 54 are revolved extends parallel to the main central longitudinal axis 8. Additionally the first and second wrapping axes extend horizontally, and in many cases may lie in a common horizontal plane. It is this arrangement of the baler 10 and the bale wrapper 11 on the chassis 5 which provides the combined baler/bale wrappers 1 and 70 according to the invention with their many advantages hereinbefore described over and above combined baler/bale wrappers known heretofore.

As discussed above, the first bale supporting roller is located as close as possible to the first pivot axis 35 so that the distance S between the rotational axis of the first bale supporting roller and the first pivot axis is as small as possible. However, in order to accommodate an overhang of the bale on the bale supporting rollers of the bale wrapper between the first bale supporting roller and the baler, it is desirable that the rotational axis of the first supporting roller should be spaced apart from the first pivot axis. In general, it has been found that by arranging the baler and the bale wrapper relative to each other on the chassis so that the horizontal distance between a vertical plane extending through the main central axis of the bale forming chamber and a vertical plane extending through the first wrapping axis lies in the range of a distance corresponding to the diameter of the bale plus 300 mm and a distance corresponding to the diameter of the bale plus 800 mm a desirable relative location between the baler and the bale wrapper is achieved.

Figure 18A:
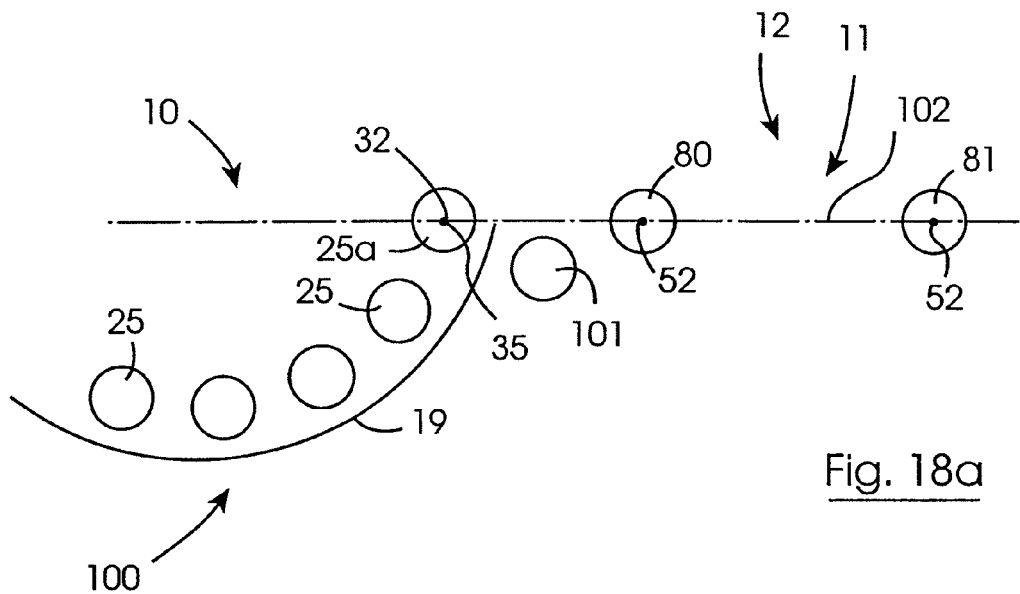
FIGS. 18a and 18b are diagrammatic side elevational views of a detail of a combined baler/bale wrapper according to a further embodiment of the invention.
Figure 18B:
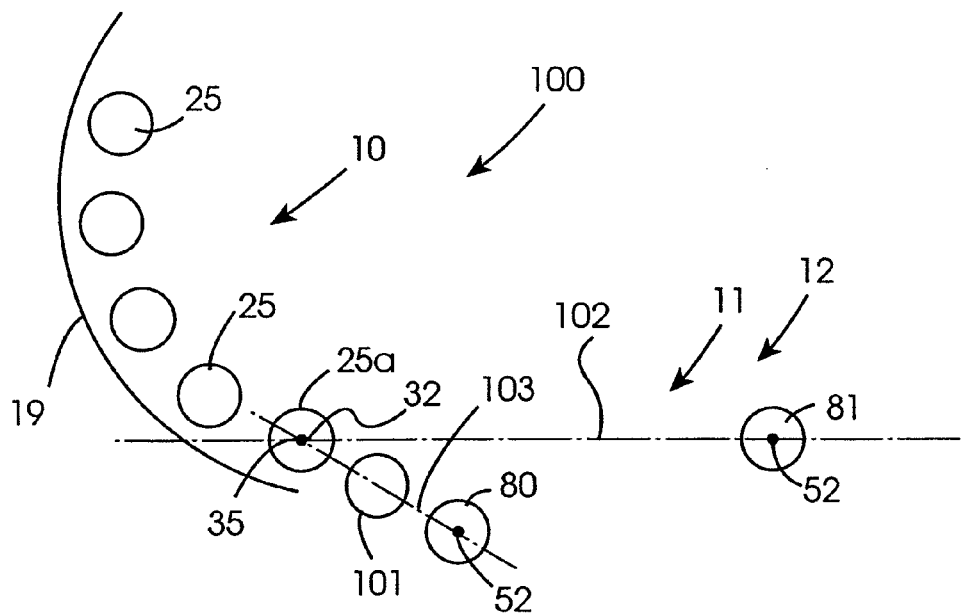

Referring now to FIGS. 18a and 18b, there is illustrated a portion 100 of a combined baler/bale wrapper according to a further embodiment of the invention. The baler/bale wrapper 100 is substantially identical to the baler/bale wrapper 70, and similar components are identified by the same reference numerals. The only part of the baler/bale wrapper 100 which is different to that of the baler/bale wrapper 70 is in the portion which is diagrammatically illustrated in FIGS. 18a and 18b. In this embodiment of the invention an intermediate roller 101 is disposed between the baler 10 and the bale wrapper 11 for supporting each bale 2 as it is being transferred from the bale forming chamber 15 of the baler 10 onto the first and second bale supporting rollers 80 and 81 of the bale wrapper 11. The intermediate roller 101 is rotatably carried in a fixed position on the chassis 5, and extends parallel to the main central axis 16 defined by the bale forming chamber 15. Thus, the intermediate roller 101 is parallel to the first pivot axis 35 of the lower segment 19 of the baler 10 and extends also parallel to the first and second bale supporting rollers 80 and 81 of the bale wrapper 11. The intermediate roller 101 is located between the first pivot axis 35, and thus the bale forming roller 25a of the lower segment 19 and the first bale supporting roller 80, and is located relatively closely to the respective bale forming roller 25a and the first bale supporting roller 80. In this embodiment of the invention the roller axes 52 of the first and second bale supporting rollers 80 and 81 and the first pivot axis 35 of the lower segment 19 lie in a common horizontal plane 102 when the first and second bale supporting rollers 80 and 81 are in the bale wrapping position. When the first and second bale supporting rollers 80 and 81 and the first pivot axis 35 lie in the common horizontal plane 102, the intermediate roller 101 is located at a level below the common horizontal plane 102. However, when the first bale supporting roller 80 takes up the bale receiving position, the intermediate roller 101 lies in an inclined common plane 103 with the first pivot axis 35 and the roller axis 52 of the first bale supporting roller 80 for facilitating ease of transfer of the bale 5 directly from the bale forming chamber 15 onto the first and second bale supporting rollers 80 and 81 when the first bale supporting roller 80 is in the bale receiving position.

Otherwise, the baler/bale wrapper 100 is similar to the baler/bale wrapper 70 described with reference to FIGS. 9 to 17, and its use and operation is also similar. The provision of the intermediate roller 101 which is located in a fixed position relative to the baler 1 and the bale wrapper 11 assists in the smooth transfer of the bale from the bale forming chamber 15 to the bale wrapper 11, and also acts to support the bale as it is being transferred from the bale forming chamber 15 to the bale wrapper 11. Although in the embodiment of the invention described the intermediate roller 101 is an idler roller, the intermediate roller 101 may be a driven roller for assisting in the transfer of the bale from the bale forming chamber 15 to the first and second bale supporting rollers 80 and 81.

It is envisaged that other suitable connecting means for connecting the first bale supporting roller to the lower segment of the baler besides the connecting linkage described with reference to FIGS. 9 to 17 may be provided. For example, in certain cases, it is envisaged that the first bale supporting roller may be carried on a support rigidly extending from the lower segment which would extend rearwardly from the lower segment beyond the first pivot axis, so that as the lower segment is being pivoted upwardly from the bale forming position the support member and the first bale supporting roller would pivot downwardly into the bale receiving position.

While the wrapping material dispensing means has been described as comprising a carrier ring which carries a pair of wrapping material dispensers for dispensing the sheet wrapping material, it is envisaged that a single wrapping material dispenser may be carried on the carrier ring, or indeed three or more wrapping material dispensers may be carried on the carrier ring. It is also envisaged that where a pair of wrapping material dispensers are provided, they need not necessarily be located at 180° intervals around the carrier ring. They may be located at other relative positions. It will also be appreciated that while it is preferable that the carrier ring should be located in a vertical plane, the carrier ring could be located in a plane inclined to the vertical, but generally, would be located in a plane which would extend in a generally upwardly/downwardly extending direction.

It is also envisaged that the transfer means instead of being provided by a lower arcuate segment of the baler may be formed by any lower portion of the baler, for example, it is envisaged that one or more of the bale forming rollers could be mounted on a pivotally mounted carrier arm, which would be pivotally mounted relative to the baler for urging the bale one or more bale forming rollers inwardly into the bale forming chamber in a generally upwardly direction for urging the bale upwardly outwardly towards the bale wrapping area onto the bale wrapper from the bale forming chamber. It is also envisaged that side portions of, for example, the lower segment could be operable for clamping the bale therebetween and for urging the bale upwardly outwardly of the bale forming chamber. It is also envisaged that the transfer means may be provided by an urging member which would not form part of the bale forming chamber, and which would be urgeable into the bale forming chamber for in turn urging the bale upwardly outwardly of the bale forming chamber. Such a transfer means could be located externally of the bale forming chamber and would be operable to extend into and traverse the bale forming chamber for discharging the bale therefrom.

Further, it is envisaged that the transfer means could be provided by a means for rotating the rollers in the lower segment, and indeed, possibly in the stationary segment when the upper segment is pivoted into the discharge position for urging the bale from the bale forming chamber.

While the baler of the baler/bale wrappers according to the invention have been described as being fixed chamber balers whereby the bale forming chamber is formed by bale forming rollers, it is envisaged that the baler may be of the fixed chamber type in which the bale forming chamber instead of being defined by bale forming rollers is defined by a bale forming belt or belts, whereby the belt or belts define a bale forming chamber. Such a baler is disclosed in U.S. Pat. No. 4,176,596 of Welger. Alternatively, the bale forming chamber may be defined by a plurality of slats carried on one or more chains or pairs of chains which define a bale forming chamber. The baler may also be of the type disclosed in U.S. Pat. No. 4,651,512 of Texas Industries, which is considered to be a fixed chamber baler, although a portion of the periphery of the bale forming chamber is moveable inwardly into the bale forming chamber for compressing the material in the bale forming chamber initially when bale forming commences, until the bale diameter increases. The baler may also be of the type disclosed in U.S. Pat. No. 4,566,379. However, in all such cases, the baler would be arranged with a transfer means for urging the bale in a generally upwardly outwardly direction from the bale forming chamber, and in particular, in a direction whereby the bale is urged along a locus of transfer extending in a general upward direction between a vertical direction and a horizontal direction for facilitating direct transfer of the bale from the bale forming chamber into the bale wrapping area onto the bale wrapper.

It is also envisaged that the baler may be a variable volume chamber baler whereby the volume of the bale forming chamber is variable from a relatively small volume at commencement of the formation of a bale progressively to a large volume when formation of the bale has been completed. Such variable volume balers are commonly referred to as belt balers.

It is also envisaged that instead of the carrier ring of the bale wrapper being rotatable, the carrier ring may be stationary and would form a track along which the wrapping material dispenser or dispensers would be moveable around the second wrapping axis. In such cases, it is envisaged that the carrier ring may not be a circular ring, but could be of any other suitable or desired shape, and in particular could be of a shape which would minimise the amount of space required beneath the bale supporting rollers and the ground.

It is envisaged that while the various motors for driving the various components of the baler and the bale wrapper have been described as being hydraulic motors, any other suitable motors whether electrically powered, pneumatically powered or otherwise could be provided. It is also envisaged that the first and second urging means for urging the lower and upper segments of the baler between the bale forming position and the discharge position may be provided by any suitable urging means and where provided by rams could be provided by pneumatic rams.

The invention claimed is:

1. A combined baler/bale wrapper for forming and wrapping a cylindrical bale of material with wrapping material, the baler/bale wrapper comprising:
   a chassis,
   a fixed chamber baler mounted on the chassis for forming a bale, the baler having a bale forming chamber within which the bale is formed, the bale forming chamber being substantially cylindrical and of substantially fixed size defining a circumferential periphery and a main central geometrical axis extending substantially horizontally, and
   a bale wrapping means mounted on the chassis for receiving the bale from the baler for wrapping thereof, wherein the baler comprises:
   a transfer means for transferring the bale from the baler to the bale wrapping means, the transfer means comprising a moveable lower portion of the baler pivotally mounted about a first pivot axis, the first pivot axis being located adjacent the circumferential periphery of the bale forming chamber and being fixed in position relative to the chassis, the moveable lower portion of the baler being pivotal about the first pivot axis from a bale forming position co-operating with the baler for forming the bale forming chamber, into the bale forming chamber in a generally upwardly direction for urging the bale in a generally upwardly outwardly direction from the bale forming chamber to the bale wrapping means, and a moveable upper portion of the baler pivotally mounted about a second pivot axis, the second pivot axis being fixed in position relative to the chassis, located adjacent the circumferential periphery of the bale forming chamber, and spaced apart circumferentially from the first pivot axis, the moveable upper portion of the baler being pivotal about the second pivot axis in a generally upwardly direction from a bale forming position extending from the second pivot axis approximately 180° circumferentially around the periphery of the bale forming chamber to the moveable lower portion and terminating adjacent the first pivot axis and co-operating with the moveable lower portion of the baler when the moveable lower portion is in the bale forming position to form the bale forming chamber, to a discharge position defining with the moveable lower portion an open mouth to the bale forming chamber for facilitating transfer of the bale by the transfer means from the bale forming chamber to the bale wrapping means, the open mouth extending from the upper moveable portion adjacent the second pivot axis to the moveable lower portion adjacent the first pivot axis.

2. A combined baler/bale wrapper as claimed in claim 1 in which the moveable lower portion of the baler is moveable through the bale forming chamber from the bale forming position to a discharge position.

3. A combined baler/bale wrapper as claimed in claim 2 in which the moveable lower portion of the baler is moveable through the main central axis of the bale forming chamber from the bale forming position to the discharge position.

4. A combined baler/bale wrapper as claimed in claim 1 in which the moveable lower portion of the baler which forms the transfer means extends around the circumferential periphery of the bale forming chamber from the first pivot axis an angular distance in the range of 50° to 160° when the moveable lower portion of the baler is in the bale forming position.

5. A combined baler/bale wrapper for forming and wrapping a cylindrical bale of material with wrapping material, the baler/bale wrapper comprising:
a chassis,
a fixed chamber baler mounted on the chassis for forming a bale, the baler having a bale forming chamber within which the bale is formed, the bale forming chamber being substantially cylindrical and of substantially fixed size defining a circumferential periphery and a main central geometrical axis, and
a bale wrapping means mounted on the chassis for receiving the bale from the baler for wrapping thereof, wherein the baler comprises:
a transfer means for transferring the bale from the baler to the bale wrapping means, the transfer means comprising a moveable lower portion of the baler, the moveable lower portion of the baler being pivotally mounted about a first pivot axis adjacent the circumferential periphery of the bale forming chamber and fixed in position relative to the chassis, and in a bale forming position the moveable lower portion of the baler extends circumferentially from the first pivot axis to define a lower segment of the circumferential periphery of the bale forming chamber and to co-operate with the baler to form the bale forming chamber, the moveable lower portion of the baler being pivotal about the first pivot axis from the bale forming position into the bale forming chamber in a generally upwardly direction for urging the bale in a generally upwardly outwardly direction from the bale forming chamber to the bale wrapping means, and a moveable upper portion of the baler pivotally mounted about a second pivot axis, the second pivot axis being fixed in position relative to the chassis and being located adjacent the circumferential periphery of the bale forming chamber spaced apart circumferentially from the first pivot axis, and in a bale forming position the moveable upper portion of the baler extends approximately 180° circumferentially from the second pivot axis to the moveable lower portion and terminates adjacent the first pivot axis to define an upper segment of the circumferential periphery of the bale forming chamber and to co-operate with the baler to form the bale forming chamber, the moveable upper portion of the baler being pivotal about the second pivot axis in a generally upwardly direction from the bale forming position to a discharge position defining with the moveable lower portion an open mouth to the bale forming chamber for facilitating transfer of the bale by the moveable lower portion from the bale forming chamber to the bale wrapping means.

6. A combined baler/bale wrapper as claimed in claim 2 in which the moveable upper and lower portions of the baler are sequentially operable between the bale forming position and the discharge position, whereby movement of the moveable upper portion from the bale forming position to the discharge position commences prior to movement of the moveable lower portion from the bale forming position to the discharge position, and movement of the moveable lower portion of the baler from the discharge position to the bale forming position commences prior to movement of the moveable upper portion of the baler from the discharge position to the bale forming position.

7. A combined baler/bale wrapper as claimed in claim 1 in which the upper portion of the baler comprises an upper arcuate segment which defines a part of the circumferential periphery of the bale forming chamber.

8. A combined baler/bale wrapper as claimed in claim 1 in which the baler comprises a bale forming means for forming the material into a bale.

9. A combined baler/bale wrapper as claimed in claim 8 in which the bale forming means comprises a plurality of bale forming rollers rotatably carried in the baler and arranged around the main central axis to define the circumferential periphery of the bale forming chamber.

10. A combined baler/bale wrapper as claimed in claim 1 in which the transfer means traverses through the bale forming chamber for urging the bale from the bale forming chamber to the bale wrapping means.

11. A combined baler/bale wrapper as claimed in claim 1 in which the baler/bale wrapper comprises a chassis, and the baler and the bale wrapping means are mounted on the chassis.

12. A combined baler/bale wrapper as claimed in claim 11 in which the chassis defines a main central longitudinal axis extending longitudinally along the chassis in the general direction of forward motion of the chassis, the main central axis defined by the bale forming chamber extending transversely of the main central longitudinal axis.

13. A combined baler/bale wrapper as claimed in claim 1 in which the bale wrapping means is a two axes bale wrapping means comprising a wrapping material dispensing means for dispensing wrapping material onto the bale for wrapping thereof, whereby the bale is rotated about a first wrapping axis substantially coinciding with a longitudinally extending geometrical axis of the bale, and one of the bale and the dispensing means is rotated about a second wrapping axis at an angle to the first wrapping axis for dispensing wrapping material onto the bale for wrapping thereof, the first wrapping axis extending substantially parallel to the main central axis defined by the bale forming chamber.

14. A combined baler/bale wrapper as claimed in claim 1 in which the moveable lower portion of the baler which forms the transfer means extends around the circumferential periphery of the bale forming chamber from the first pivot axis an angular distance in the range of 60° to 115° when the moveable lower portion of the baler is in the bale forming position.

15. A combined baler/bale wrapper as claimed in claim 1 in which the moveable lower portion of the baler which forms the transfer means comprises a lower arcuate segment which defines a part of the circumferential periphery of the bale forming chamber when the moveable lower portion of the baler is in the bale forming position.

16. A combined baler/bale wrapper as claimed in claim 1 in which a stationary arcuate segment defining a part of the bale forming chamber extends along the circumferential periphery of the bale forming chamber between the upper moveable portion and the lower moveable portion of the bale forming chamber.

17. A combined baler/bale wrapper as claimed in claim 16 in which the stationary arcuate segment extends along the circumferential periphery of the bale forming chamber from the second pivot axis.

18. A combined baler/bale wrapper for forming and wrapping a cylindrical bale of material with wrapping material, the baler/bale wrapper comprising:
  a chassis,
  a fixed chamber baler mounted on the chassis for forming a bale, the baler having a bale forming chamber within which the bale is formed, the bale forming chamber being substantially cylindrical and of substantially fixed size defining a circumferential periphery and a main central geometrical axis, and
  a bale wrapping means mounted on the chassis for receiving the bale from the baler for wrapping thereof, wherein the baler comprises:
  a transfer means for transferring the bale from the baler to the bale wrapping means, the transfer means comprising a moveable lower arcuate segment of the baler, the moveable lower arcuate segment of the baler being pivotally mounted about a first pivot axis adjacent the circumferential periphery of the bale forming chamber and fixed in position relative to the chassis, and in a bale forming position the moveable lower arcuate segment extends circumferentially from the first pivot axis to define a lower segment of the circumferential periphery of the bale forming chamber and to co-operate with the baler to form the bale forming chamber, the moveable lower arcuate segment of the baler being pivotal about the first pivot axis from the bale forming position into the bale forming chamber in a generally upwardly direction for urging the bale in a generally upwardly outwardly direction from the bale forming chamber to the bale wrapping means, and
  a moveable upper arcuate segment of the baler pivotally mounted about a second pivot axis, the second pivot axis being fixed in position relative to the chassis and being located adjacent the circumferential periphery of the bale forming chamber spaced apart circumferentially from the first pivot axis, and in a bale forming position the moveable upper arcuate segment of the baler extends approximately 180° circumferentially from the second pivot axis to the moveable lower arcuate segment and terminates adjacent the first pivot axis to define an upper segment of the circumferential periphery of the bale forming chamber and to co-operate with the baler to form the bale forming chamber, the moveable upper arcuate segment of the baler being pivotal about the second pivot axis in a generally upwardly direction from the bale forming position to a discharge position defining with the moveable lower arcuate segment an open mouth to the bale forming chamber for facilitating transfer of the bale by the moveable lower arcuate segment from the bale forming chamber to the bale wrapping means.

19. A combined baler/bale wrapper for forming and wrapping a cylindrical bale of material with wrapping material, the baler/bale wrapper comprising:
  a chassis,
  a fixed chamber baler mounted on the chassis for forming a bale, the baler having a bale forming chamber within which the bale is formed, the bale forming chamber being substantially cylindrical and of substantially fixed size defining a circumferential periphery and a main central geometrical axis, and
  a bale wrapping means mounted on the chassis for receiving the bale from the baler for wrapping thereof, wherein the baler comprises:
  a moveable lower segment,
  a moveable upper segment, and
  a stationary segment fixed in position relative to the chassis and located between the moveable lower segment and the moveable upper segment, the moveable lower segment and the moveable upper segment, when in respective bale forming positions, forming with the stationary segment the circumferential periphery of the bale forming chamber,
  the moveable lower segment being pivotal about a first pivot axis, the first pivot axis being fixed in position relative to the chassis and located adjacent the circumferential periphery of the bale forming chamber, and in the bale forming position the moveable lower segment extends from the first pivot axis towards the stationary segment to define a lower segment of the circumferential periphery of the bale forming chamber,
  the moveable upper segment being pivotal about a second pivot axis, the second pivot axis being located adjacent the stationary segment and adjacent the circumferential periphery of the bale forming chamber spaced apart circumferentially from the first pivot axis, and being fixed in position relative to the chassis, and in the bale forming position the moveable upper segment extends approximately 180° circumferentially from the second pivot axis to the moveable lower segment and terminates adjacent the first pivot axis to define an upper segment of the circumferential periphery of the bale forming chamber, and wherein
  the moveable lower segment forms a transfer means and is pivotal about the first pivot axis from the bale forming position into the bale forming chamber in a generally upwardly direction for urging the bale in a generally upwardly outwardly direction from the bale forming chamber to the bale wrapping means, and
  the moveable upper segment is pivotal about the second pivot axis in a generally upwardly direction from the bale forming position to a discharge position defining with the moveable lower segment an open mouth to the bale forming chamber for accommodating transfer of the bale by the moveable lower segment from the bale forming chamber to the bale wrapping means.

20. A combined baler/bale wrapper as claimed in claim 19 in which the moveable lower segment comprises a moveable lower arcuate segment, and the moveable upper segment comprises a moveable upper arcuate segment.

21. A combined baler/bale wrapper for forming and wrapping a cylindrical bale of material with wrapping material, the baler/bale wrapper comprising:

a chassis, a baler mounted on the chassis for forming a bale, the baler having a bale forming chamber within which the bale is formed, the bale forming chamber being substantially cylindrical defining a circumferential periphery and a main central geometrical axis, and a bale wrapping means mounted on the chassis for receiving the bale from the baler for wrapping thereof, wherein the baler comprises:

a moveable lower segment, a moveable upper segment, and a stationary segment fixed in position relative to the chassis and located between the moveable lower segment and the moveable upper segment, the moveable lower segment and the moveable upper segment when in respective bale forming positions forming with the stationary segment the circumferential periphery of the bale forming chamber, the moveable lower segment being pivotal about a first pivot axis, the first pivot axis being fixed in position relative to the chassis and located adjacent the circumferential periphery of the bale forming chamber, and in the bale forming position the moveable lower segment extends from the first pivot axis towards the stationary segment to define a lower segment of the circumferential periphery of the bale forming chamber, the moveable upper segment being pivotal about a second pivot axis, the second pivot axis being located adjacent the stationary segment and adjacent the circumferential periphery of the bale forming chamber spaced apart circumferentially from the first pivot axis, and being fixed in position relative to the chassis, and in the bale forming position the moveable upper segment extends approximately 180° circumferentially from the second pivot axis to the moveable lower segment and terminates adjacent the first pivot axis to define an upper segment of the circumferential periphery of the bale forming chamber, and wherein the moveable lower segment forms a transfer means and is pivotal about the first pivot axis from the bale forming position into the bale forming chamber in a generally upwardly direction for urging the bale in a generally upwardly outwardly direction from the bale forming chamber to the bale wrapping means, and the moveable upper segment is pivotal about the second pivot axis in a generally upwardly direction from the bale forming position to a discharge position defining with the moveable lower segment an open mouth to the bale forming chamber for accommodating transfer of the bale by the moveable lower segment from the bale forming chamber to the bale wrapping means.

* * * * *